United States Patent [19]

Takayanagi

[11] Patent Number: 5,571,575
[45] Date of Patent: Nov. 5, 1996

[54] LASER SHOCK METHOD UTILIZING LIGHT ABSORBING MATERIAL

[75] Inventor: Noboru Takayanagi, Tajimi, Japan

[73] Assignee: Toyota Jidosha Kabushiki Kaisha, Aichi, Japan

[21] Appl. No.: 498,728

[22] Filed: Jul. 6, 1995

Related U.S. Application Data

[63] Continuation of Ser. No. 352,868, Dec. 2, 1994, abandoned.

[30] Foreign Application Priority Data

Dec. 7, 1993 [JP] Japan .................................. 5-306664
Aug. 24, 1994 [JP] Japan .................................. 6-199278

[51] Int. Cl.$^6$ .................................................... B05D 3/00
[52] U.S. Cl. ........................... 427/9; 427/178; 427/327; 427/402; 427/422; 427/446; 427/554; 427/596
[58] Field of Search ........................ 427/554, 9, 596, 427/402, 446, 327, 178, 422

[56] References Cited

U.S. PATENT DOCUMENTS

| | | | |
|---|---|---|---|
| 4,401,477 | 8/1983 | Clauer et al. | 148/4 |
| 4,937,421 | 6/1990 | Oritz, Jr. et al. | 219/121.68 |

FOREIGN PATENT DOCUMENTS

| | | |
|---|---|---|
| 0085278 | 8/1983 | European Pat. Off. . |
| 0094912 | 11/1983 | European Pat. Off. . |
| 0319397 | 6/1989 | European Pat. Off. . |
| 0416988 | 3/1991 | European Pat. Off. . |
| 58-120716 | 7/1983 | Japan . |
| 58-207321 | 12/1983 | Japan . |
| 5-271900 | 10/1993 | Japan . |

OTHER PUBLICATIONS

"Laser Shock Experiments at Pressures Above 100 Mbar," *Physica 139 & 140B* (1986), pp. 595–598. (no month available).

"Mechanical Effects Induced By Shock Waves Generated By High Energy Laser Pulses," *J. Phys. III France 1* (1991), pp. 1467–1480. (no month available).

"Characteristics of Compressional Shocks Resulting From Picosecond Heating of Confined Foils," *Appl. Phys. Lett.*, vol. 45, No. 10 (1984), pp. 1049–1051. (no month available).

"Ultrafast Laser–Induced Stress Waves in Solids," *Appl. Phys. Lett.*, vol. 18, No. 1 (1971), pp. 33–35. (no month available).

"Laser Generated Stress Waves: Their Characteristics and Their Effects to Materials," *Laser–Solid Interactions and Laser Processing*, AIP Conf. Proc. No. 50 (1979), pp. 27–42.

"Laser Generation of High–Amplitude Stress Waves in Materials," *J. Appl. Phys.*, vol. 50, No. 3 (1979) pp. 1497–1502. (no month available).

*Primary Examiner*—Bernard Pianalto
*Attorney, Agent, or Firm*—Oliff & Berridge

[57] ABSTRACT

A laser shock processing method by which a light absorbing material is evaporated by irradiation of laser light and a shock is applied to a metallic workpiece by utilizing an increase in pressure due to the evaporation of the light absorbing material. In this method, the absorbing material is sprayed on the workpiece under the control of a coating spraying control unit while the thickness of a coating formed on the workpiece is simultaneously measured by a thickness gauge provided with a sensor. Thus, a coating of even thickness is formed on the workpiece. Thereby, evaporation of the coating can be uniformly generated by the irradiation of laser light after the formation of overlays. Further, a shock due to the evaporation of the coating can be uniformly applied to the workpiece. Moreover, the laser shock processing can be performed on a large area of the surface of the workpiece uniformly. Furthermore, uniform compressive stress can be imparted thereto. Therefore, the variation in fatigue strength in the processed area can be eliminated.

20 Claims, 18 Drawing Sheets

RELATION BETWEEN THICKNESS OF BLACK PAINT FILM AND RESIDUAL STRESS IN OUTERMOST SURFACE PORTION (LASER POWER DENSITY = 2.0 GW/cm$^2$)

RELATION BETWEEN NUMBER OF IRRADIATION SHOTS AND THICKNESS OF FILM

RELATION BETWEEN LASER POWER DENSITY AND RESIDUAL STRESS IN OUTERMOST SURFACE PORTION

RELATION BETWEEN IRRADIATION PITCH WIDTH AND FATIGUE STRENGTH

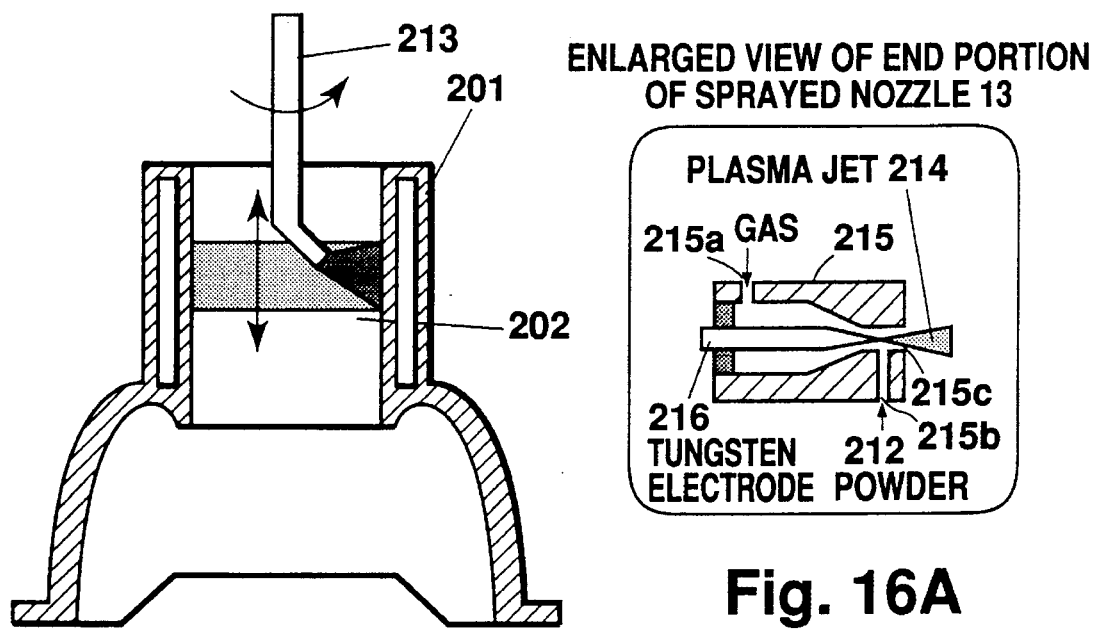
Fig. 16
Fig. 16A
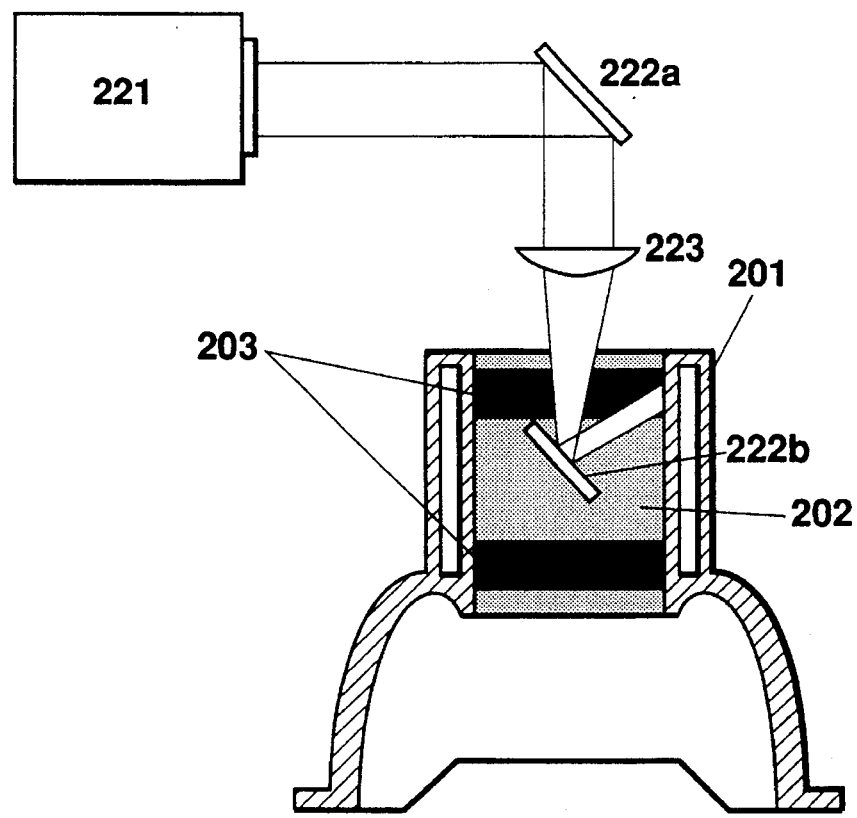
Fig. 17

LASER SHOCK METHOD UTILIZING LIGHT ABSORBING MATERIAL

This is a Continuation of application Ser. No. 08/352,868 filed Dec. 2, 1994, now abandoned.

BACKGROUND OF THE INVENTION

1. Field of the Invention

This invention relates to laser shock processing in which an absorbing material layer for absorbing laser light is first provided on the surface of a metallic workpiece and subsequently, the absorbing material layer is covered with a light transmitting member layer, and thereafter, these layers are irradiated with laser light pulses, whereby a shock due to the evaporation of the absorbing material is passed to the metallic workpiece.

2. Description of the Prior Art

Previously, a method of applying a shock to a metallic material and increasing the compressive residual stress thereof has been performed for the purpose of improving the physical properties such as the mechanical strength. An example of such a method is what is called a laser shock processing method which can apply a large shock to a metallic material locally and thus has been put to various uses.

For example, an example of the conventional laser shock processing method is disclosed in the Japanese Patent Public Disclosure Official Gazette (Kokai Koho) No. 58-120716/ 1983 (JP-A-58120716) which corresponds to U.S. patent application Ser. No. 334,612. FIG. 16 is a diagram illustrating this conventional laser shock processing method. As shown in FIG. 16, the top surface 41a and the bottom surface 41b of a metallic target 41 are coated with absorbing coating materials (coatings or paints (not shown)). A first overlay (a light transmitting member) 42 is mounted on the coated top surface 41a of the target 41 and a second overlay (a light transmitting member) 43 is mounted on the coated bottom surface 41b thereof.

A high-energy laser light short pulse 51 emitted from a laser 44 is split by a spectroscope (a semitransparent mirror) 45 into laser light pulses 52 and 53. The laser light pulse 52 is sequentially reflected by a first mirror 46 and a second mirror 47 in this order. Then, the reflected laser light pulse is focused by a first convex lens 48 and is further transmitted by the first overlay 42. The coating formed on the top surface 41a of the target 41 is irradiated with the transmitted laser light pulse. On the other hand, the laser light pulse 53 is reflected by a third mirror 49 and is then focused by a second convex lens 50. Subsequently, the focused laser light pulse 53 is transmitted by the second overlay 43. Thereafter, the coating formed on the bottom surface 41b of the target 41 is irradiated with the transmitted laser light pulse 53.

When irradiating the coatings with the laser light pulses 52 and 53, evaporation coating gas is produced from the surfaces of the coatings and further expands instantaneously. Then, the pressure exerted on the top surface 41a and the bottom surface 41b of the target 41 increases almost instantaneously owing to the presence of the first overlay 42 and the second overlay 43. This results in that the shock wave of pressure is applied to the top surface 41a and the bottom surface 41b of the target 41. This shock wave causes compressive residual stress in the surface portion of the target 41. Moreover, the fatigue strength of the target 41 increases owing to this compressive residual stress.

Thus, in accordance with this conventional method, compressive residual stress can be imparted to a desired portion of the metallic target 41. Therefore, this conventional method is suitable for increasing the fatigue strength of a bent portion of a crankshaft, which is locally strained.

However, this laser shock processing technique is comparatively new. Thus, only a small quantity of data regarding actual results of this processing has been accumulated. Further, various experiments performed by employing this conventional technique have showed that there have been many cases where the fatigue strength is not sufficiently increased.

Thus, extensive studies of this laser shock processing have been further conducted. As a result, it has come to light that if the coatings formed on the top surface 41a and the bottom surface 41b of the target 41 do not have even thickness, nonuniform compressive residual stress is caused therein and that if the compressive residual stress is insufficient in a part of the target 41, this part of the target 41 does not have sufficient fatigue strength.

Especially, in case where the same portion of the surface of the target 41 is irradiated with laser light pulses many times in order to exert as deep an effect on the target 41 as possible, and in case where a large area of the surface of the target 41 is continuously processed by performing partially overlapping irradiations of laser light pulses, the surface of the target 41 is recoated with the coating or paint prior to each of the irradiations. It has been discovered that in such cases, not all of the coating applied to the surface of the target 41 is evaporated at a laser light irradiation, that it is, therefore, difficult to control the thickness of the coating in such a manner as to be uniform before each irradiation of the laser light pulse and that the coating is thus liable to have non-uniform thickness.

Further, in the case of employing the conventional method, after the surface of the target is coated with the absorbing coating materials and the overlay 42 or 43, the thickness of a film consisting of the absorbing coating material and the overlay 42 or 43 can not be held constant. As a result, the focal distance of the lens changes with every irradiation of the laser light pulse. Consequently, the impartation of uniform residual stress to the target 41 can not be realized.

Moreover, in the case where the surface of the target is coated with the coating or paint, the step of drying the coating is necessary. Thus, there has been a demand for omission of the drying step. Especially, in the case of repeating the laser shock processing, the omission of the drying step greatly facilitates the laser shock processing.

SUMMARY OF THE INVENTION

Accordingly, an object of the present invention is to provide a laser shock processing method by which controlled compressive residual stress Is generated in a metallic workpiece and the fatigue strength of the metallic workpiece can be increased desirably.

Further, another object of the present invention is to provide a laser shock processing method by which laser shock processing can be performed at an optimum laser power density at all times.

Moreover, a further object of the present invention is to provide a laser shock processing method by which the optimum distribution of compressive residual stresses for increasing the fatigue strength of a metallic workpiece can be imparted to the entire surface layer portion of the metallic workpiece, and even if the surface of the metallic workpiece has a large area, the fatigue strength thereof can be increased desirably.

Furthermore, still another object of the present invention is to provide a laser shock processing method by which controlled compressive residual stress is generated in a metallic workpiece, and the fatigue strength of the metallic workpiece can be substantially increased and moreover, the complexity of the laser shock processing step can be reduced and furthermore, the laser shock processing step can be efficiently performed.

Additionally, yet another object of the present invention is to provide a laser shock processing method by which compressive residual stress can be generated in a metallic workpiece without deteriorating the surface roughness thereof as a result of a laser shock processing, and therefore, the fatigue strength of the metallic workpiece can be substantially increased.

To achieve the foregoing objects, in accordance with one aspect of the present invention, there is provided a laser shock processing method for evaporating a light absorbing material by irradiation of laser light and for applying a shock to a metallic workpiece by utilizing an increase in pressure due to the evaporation of the light absorbing material, which comprises the step of forming a light absorbing material layer for absorbing laser light, on the surface of the metallic workpiece, while simultaneously measuring the thickness of the light absorbing material layer and for performing a control operation in such a manner that the light absorbing material layer has a predetermined thickness, the step of covering the formed light absorbing material layer with a light transmitting member layer and the step of irradiating the light absorbing material layer with a laser light pulse through the light transmitting member layer.

Thus, in accordance with this method, the light absorbing material layer is formed, while simultaneously detecting the thickness thereof, in such a manner that the light absorbing material layer has a uniform thickness. Then, the surface portion of the light absorbing material layer of the uniform thickness is evaporated owing to the shock caused by the laser light pulse, and, further the evaporation gas expands. At that time, the evaporation gas is restrained by the light transmitting member from expanding in the direction of the light transmitting member. Thus, the pressure shock wave due to the expansion of the evaporation gas is applied to the surface of the metallic workpiece, so that the shock wave becomes uniform and moreover even compressive residual stress is generated in the metallic workpiece. As a result, the fatigue strength of the metallic workpiece can be increased uniformly.

Further, in accordance with another aspect of the present invention, there is provided a laser shock processing method for evaporating a light absorbing material by the irradiation of laser light and for applying a shock to a metallic workpiece by utilizing an increase in pressure due to the evaporation of the light absorbing material, which comprises the step of forming a light absorbing material layer for absorbing laser light, on the surface of the metallic workpiece, the step of covering the formed light absorbing material layer with a light transmitting member layer and the step of irradiating the light absorbing material layer through the light transmitting member layer with a laser light pulse of predetermined strength while simultaneously regulating the focal distance of focusing means for focusing the laser light.

Thus, in accordance with this method, the focal distance of the focusing means is regulated so as to correspond to each irradiated laser light pulse independent of change in the thickness of a film consisting of the light absorbing material layer and the light transmitting member layer. Thereby, the laser shock processing can be performed at an optimum laser power density at all times.

Moreover, in accordance with a further aspect of the present invention, there is provided a laser shock processing method for evaporating a light absorbing material by the irradiation of laser light and for applying a shock to a metallic workpiece by utilizing an increase in pressure due to the evaporation of the light absorbing material, which comprises the step of forming a light absorbing material layer for absorbing laser light, on the surface of the metallic workpiece, while simultaneously measuring the thickness of the light absorbing material layer and for performing a control operation in such a manner that the light absorbing material layer has a predetermined thickness, the step of covering the formed light absorbing material layer with a light transmitting member layer and the step of irradiating the light absorbing material layer through the light transmitting member layer with a laser light pulse while the light absorbing material layer to be irradiated with the laser light pulse is moved successively at a pitch which ensures that no unirradiated portion occurs.

Thus, in accordance with this method, the optimum distribution of the compressive residual stresses, which is best-suited for increasing the fatigue strength of the metallic workpiece, can be imparted to the entire surface layer portion of the metallic workpiece. Thereby, even if the surface of the metallic workpiece has a large area, the fatigue strength thereof can be increased uniformly.

Furthermore, in accordance with still another aspect of the present invention, there is provided another laser shock processing method for evaporating a light absorbing material by irradiation of laser light and for applying a shock to a metallic workpiece by utilizing an increase in pressure due to the evaporation of the light absorbing material. This method comprises the step of mounting a light absorbing film, which is formed in such a manner as to have a predetermined thickness and is made of a light absorbing material for absorbing laser light, on the surface of the metallic workpiece, the step of mounting a light transmitting member on the light absorbing film and the step of irradiating the light absorbing film with a laser light pulse through the light transmitting member.

Thus, in accordance with this method, the surface portion of the absorbing film of the uniform thickness is evaporated owing to the shock caused by the laser light pulse, and further, the evaporation gas expands. At that time, the evaporation gas is restrained by the light transmitting member from expanding in the direction of the light transmitting member. Thus, the shock wave of the pressure due to the expansion of the evaporation gas is applied to the surface of the metallic workpiece, so that the shock wave becomes uniform and moreover, even compressive residual stress is generated in the metallic workpiece. Consequently, the fatigue strength of this metallic workpiece can be substantially increased. Moreover, as the result of employing the absorbing film, the complexity of the laser shock process can be reduced. Further, the laser shock process can be efficiently performed.

Additionally, in accordance with yet another aspect of the present invention, there is provided a laser shock processing method for evaporating a light absorbing material by the irradiation of laser light and for applying a shock to a metallic workpiece by utilizing an increase in pressure due to the evaporation of the light absorbing material, which comprises the step of performing chemical polishing on the surface of the metallic workpiece, the step of forming a light absorbing material layer on the polished surface of the metallic workpiece, the step of mounting a light transmitting member on the light absorbing material layer and the step of irradiating the light absorbing material layer with a laser light pulse through the light transmitting member.

Thus, in accordance with this method, compressive residual stress is generated in the metallic workpiece without deteriorating the surface roughness thereof as a result of the laser shock processing. Therefore, the fatigue strength of the metallic workpiece can be substantially increased.

BRIEF DESCRIPTION OF THE DRAWINGS

Other features, objects and advantages of the present invention will become apparent from the following description of preferred embodiments with reference to the drawings, in which:

FIG. 16 is a diagram illustrating a flame spraying processing;

FIG. 16A is an enlarged view of a tip end portion of a flame spraying nozzle;

FIG. 17 is a diagram illustrating a laser shock processing;

DETAILED DESCRIPTION OF THE PREFERRED EMBODIMENTS

Figure 1:
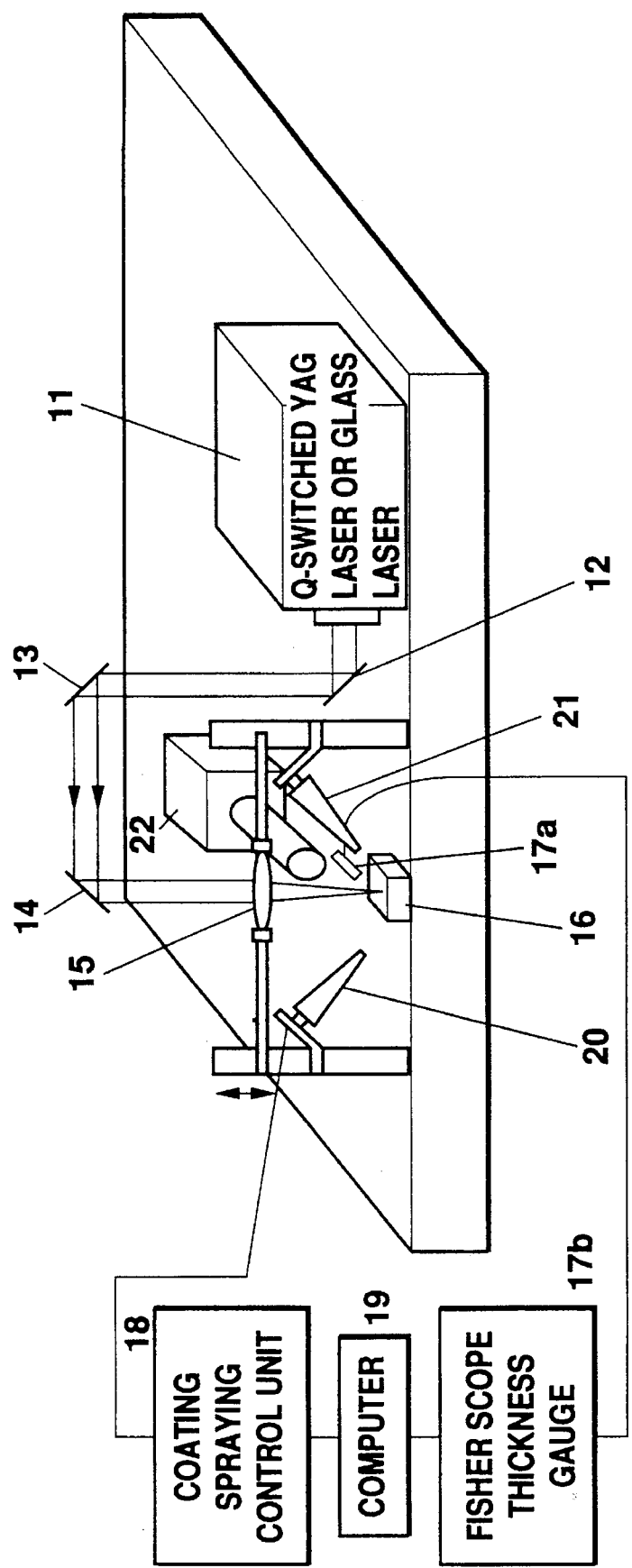
FIG. 1 is a schematic block diagram illustrating the configuration of a first embodiment of the present invention.
Figure 2:
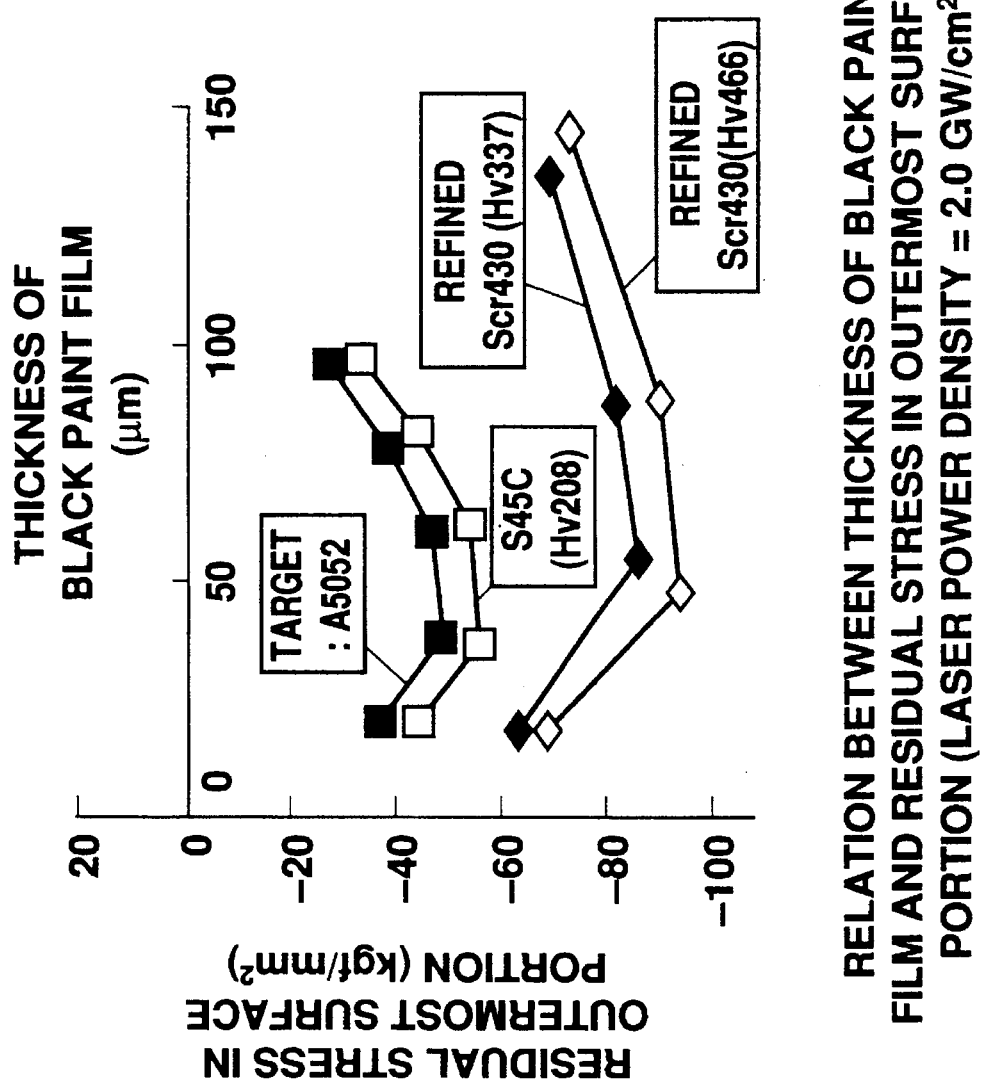
FIG. 2 is a diagram illustrating the relationship between the thickness of a film and the residual stress generated in the outermost surface.
Figure 3:
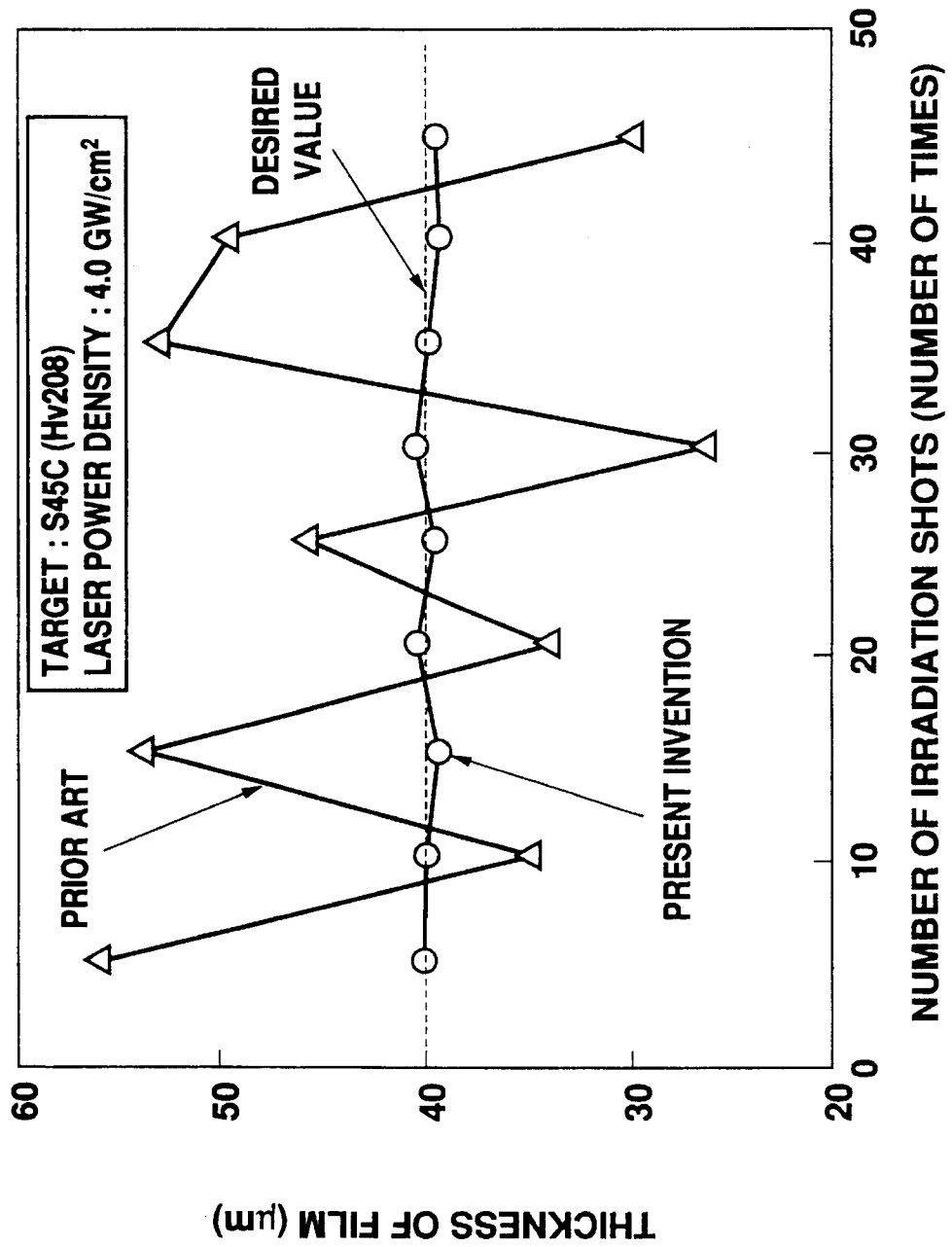
FIG. 3 is a diagram illustrating the relationship between the number of irradiation shots and the thickness of a film.

Next, the first embodiment of the present invention will be described in detail by referring to FIGS. 1 to 3. FIG. 1 shows the configuration of this embodiment schematically. FIG. 2 illustrates the relationship between the thickness of a film and the residual stress generated in the outermost surface portion of this embodiment. FIG. 3 illustrates the relationship between the number of irradiation shots and the thickness of the film.

As shown in FIG. 1, laser light emitted from a laser oscillator 11 (namely, a Q-switched YAG (Yttrium Aluminium Garnet) laser) is sequentially reflected by mirrors 12, 13 and 14 in this order. Then, the reflected laser light is focused by a collective lens (namely a converging lens) 15 (f=150 mm) and further is applied to the surface of a metallic target 16. Before being irradiated with laser light, the surface of the target 16 is coated with an absorbing coating material film (a black paint film (not shown)) and an overlay (not shown) in this order. The absorbing coating material film serves to increase the absorption of laser light and evaporates and expands when absorbing the laser light. Further, the overlay is operative to confine evaporation film gas expanding at the time of absorbing the laser light and to thereby generate a shock wave in the surface portion of the target 16.

At that time, the thickness of the absorbing coating material film prior to the irradiation of laser light is measured by a thickness gauge 17 having a sensor 17a. Further, data representing a result of this measurement is supplied to a computer 19. The computer 19 controls a coating spraying control unit 18 to perform a feedback control operation on the quantity of the coating sprayed from an absorbing coating material spraying nozzle 20 and to thereby regulate the thickness of the film to a predetermined value.

Further, in the case of this embodiment, the "FISHER SCOPE" (a trade name) is utilized as the thickness gauge 17b. This FISHER SCOPE is an electromagnetic non-destructive thickness measuring device used to measure the thickness of a non-magnetic film or an insulating coat placed on a magnetic metal. The FISHER SCOPE detects a change in the number of lines of magnetic force emitted from the target by pointing a measuring probe at the target in order to generate lines of magnetic force. Thereby, the FISHER SCOPE can detect the distance between the probe and a magnetic substance and can measure the thickness of a film. Alternatively, a thickness gauge of another type may be employ Incidentally, a drier 22 is operative to blow dry air and is used to dry the absorbing coating material and the overlays. The acceleration of the drying of the absorbing coating material and the overlays, as well as the speed-up of the forming of a film of a predetermined thickness, can be achieved by forming the absorbing coating material and the overlays while simultaneously blowing dry air thereon from the drier 22.

Four kinds of materials, namely, aluminum alloy A5052 (according to Japanese Industrial Standard), structural carbon steel S45C (according to Japanese Industrial Standard) and two kinds of refined (namely, quenched and tempered) chromium, steel (Scr430 (according to Japanese Industrial Standard)) are employed as the material of the target 16. Further, the absorbing coating material consists of 80 wt % resin (namely, a mixture of alkyd resin and cellulose nitrate), 11 wt % additive (namely, paraffin wax) and 9 wt % pigment (namely, a mixture of carbon and barium sulfate). Furthermore, the absorbing coating material is sprayed from the absorbing-coating-material film forming nozzle 20 at a spraying air pressure of 4 kgf/cm$^2$. The overlay is made of clear lacquer of the nitrocellose lacquer type and is sprayed from a light absorbing material film forming nozzle 21 at a spraying air pressure of 4 kgf/cm$^2$. The details of processing conditions are presented in TABLE 1.

TABLE 1

| Processing Conditions | | |
|---|---|---|
| Primary parameters | | Conditions In This Case |
| Laser Irradiation Conditions | Pulse Energy | 300 mJ |
| | Pulse Width | 10 nsec |
| | Pulse Waveform | Super Gaussian |
| | Power Density | 2.0–10.0 GW/cm$^2$ |
| Absorbing Coating Material | Kind | Lacquer |
| | Film Thickness | 15–150 μm |
| Overlay | Kind | Clear Lacquer |

FIG. 2 shows the relationship between the thickness of the film and the residual stress generated in the outermost surface portion of the target. As is seen from this figure, the residual stress becomes large at the film thickness of about 30 to 60 μm in the case of employing A5052 or S45C as the material of the target. Further, in cases of employing Scr430 as the material of the target, the compressive residual stress becomes large at the film thickness of about 50 to 100 μm. Thus, this shows that there is an optimum film thickness, at which the compressive residual stress is maximized, and that as the hardness of the material of the target 16 increases, the optimum thickness of the film shifts to the thick film side (to the right side as viewed in this figure), namely, it becomes larger. Incidentally, at that time, the power density of irradiated laser light is 2.0 GW/cm$^2$.

On the other hand, FIG. 3 illustrates the relationship between the number of irradiation shots of laser light and the thickness of the film. This shows that the variation in the ratio of the thickness of the film to the number of irradiation shots is within the (–5%) to 5% range in the case of the method of the present invention and that in contrast, the variation in case of the prior art is within the (–40%) to 40% range. Namely, as is seen from FIG. 2, the 40% variation in the thickness of the film corresponds to about a 20 kgf/mm$^2$ variation in the residual stress. Thus, it can be conjectured that the variation in the thickness of the film has a great effect on reduction in the fatigue strength of the target.

Therefore, it is discovered that large and uniform compressive stress can be imparted to the target by controlling or regulating the optimum thickness of the film.

Incidentally, depending on the kind of target, there may be a demand that residual stresses occurring in the target should vary at different regions thereof. For example, a certain component has a region onto which stresses concentrate under usage conditions. Thus, there is a demand that residual stresses occurring in such a region should be large. Further, in the case of other components, there is a demand that high wear resistance should be imparted to a region thereof over which another component slides.

In the case of this embodiment, as described above, desired residual stress can be obtained by controlling or regulating the thickness of a film or coating. Thus the optimal control of the residual stress can be achieved by controlling or regulating the thickness of the film according to required levels of, for instance, wear resistance, which depend on regions of a target to be processed.

Figure 4:
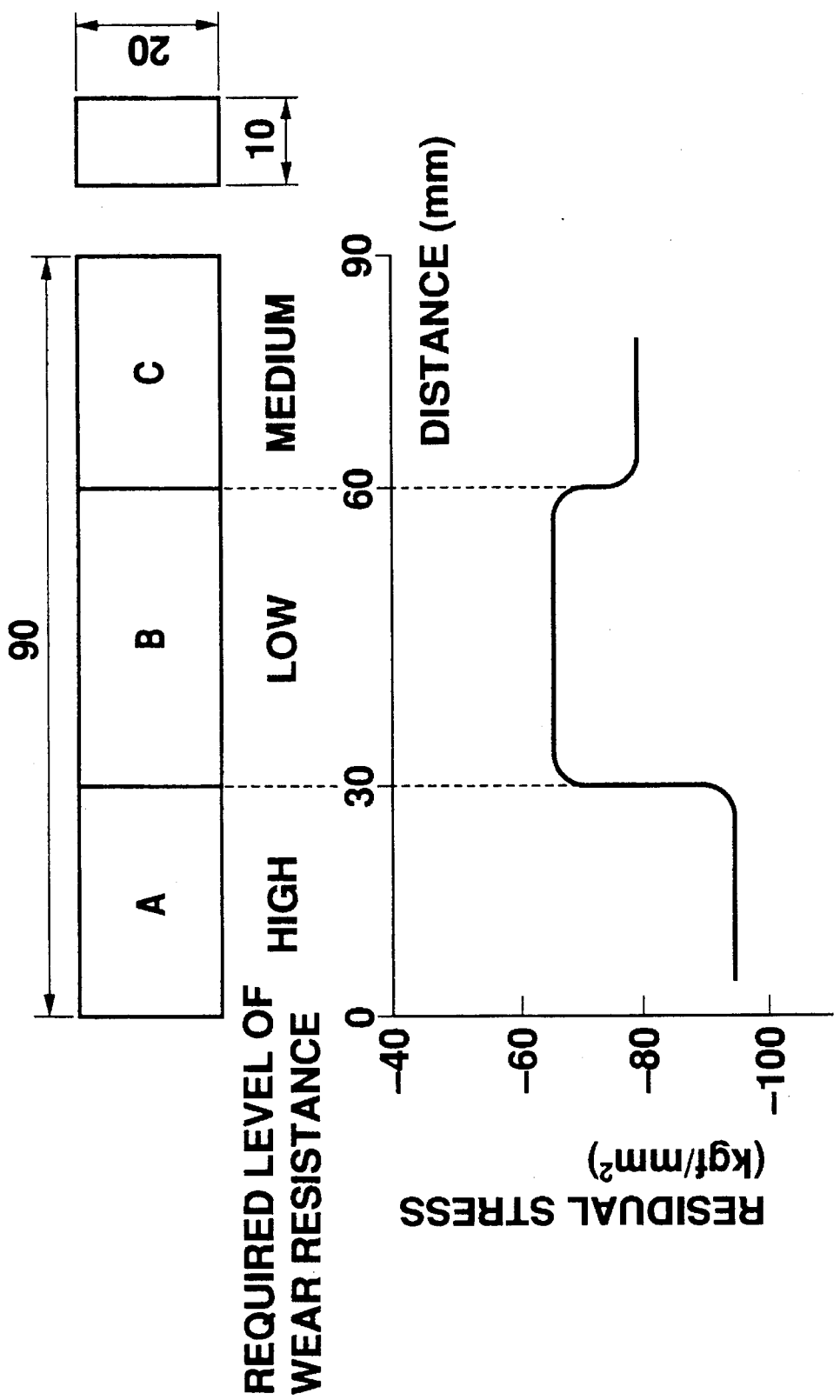
FIG. 4 is a diagram illustrating the required levels of wear resistance and the optimum distribution of residual stress for obtaining the required levels of wear resistance.
Figure 5:
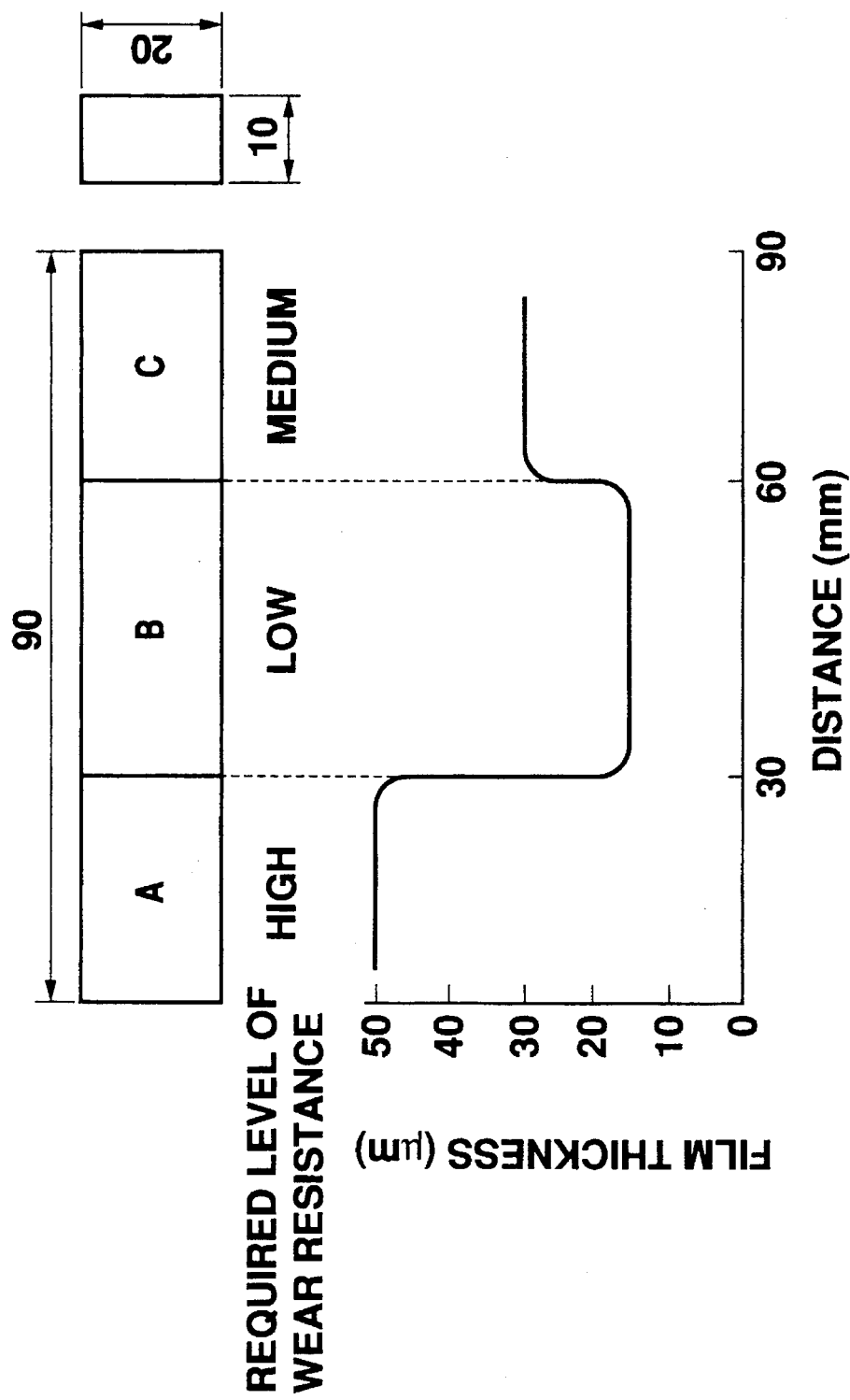
FIG. 5 is a diagram illustrating the relationship between the level of wear resistance and thickness of a film.

FIG. 4 is a diagram for illustrating the required levels of wear resistance, which vary with regions of a target, and an example of the optimum distribution of residual stresses which occur in the surface portion of the target and are necessary for obtaining the required levels of wear resistance. As illustrated in this figure, in the case of Region A in which the required level of wear stress is high, the residual stress of –95 kgf/mm$^2$ is needed. Further, in the case of Region B in which the required level of wear stress is low, the residual stress; of –65 kgf/mm$^2$ is needed. Moreover, in the case of Region C in which the required level of wear stress is medium, the residual stress of –82 kgf/mm$^2$ is needed. The relationship between the level of wear resistance and the thickness of a film as illustrated in FIG. 5 is obtained by substituting the thickness of the film for the residual stress occurring in the surface portion of the target on the basis of the relationship illustrated in FIG. 2. Namely, in the case of Region A in which the required level of wear stress is high, the film thickness of 50 μm is needed. Further, in the case of Region B in which the required level of wear stress is low, the film thickness of 15 μm is needed. Moreover, in the case of Region C in which the required level of wear stress is medium, the film thickness of 30 μm is needed. Thus, in accordance with this embodiment, the required distribution of residual stresses can be obtained by controlling the thickness of a film to form the film of the required optimum thickness and by then performing laser shock processing.

In accordance with this embodiment, the thickness of a film or coating can be controlled in this way. Therefore, the optimal control of the film thickness can be achieved for, for example, designing a target to obtain the optimum wear resistance.

Figure 6:
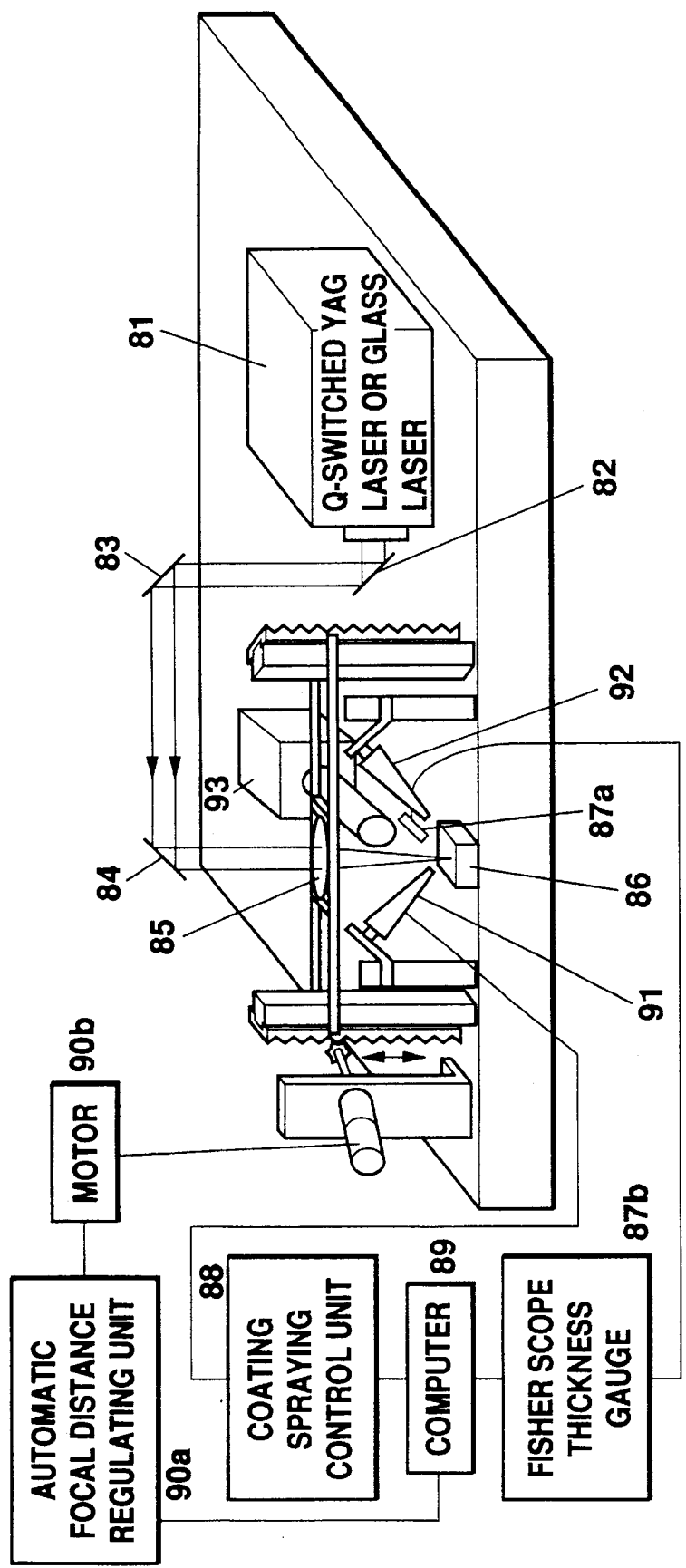
FIG. 6 is a schematic block diagram illustrating the configuration of a second embodiment of the present invention.
Figure 7:
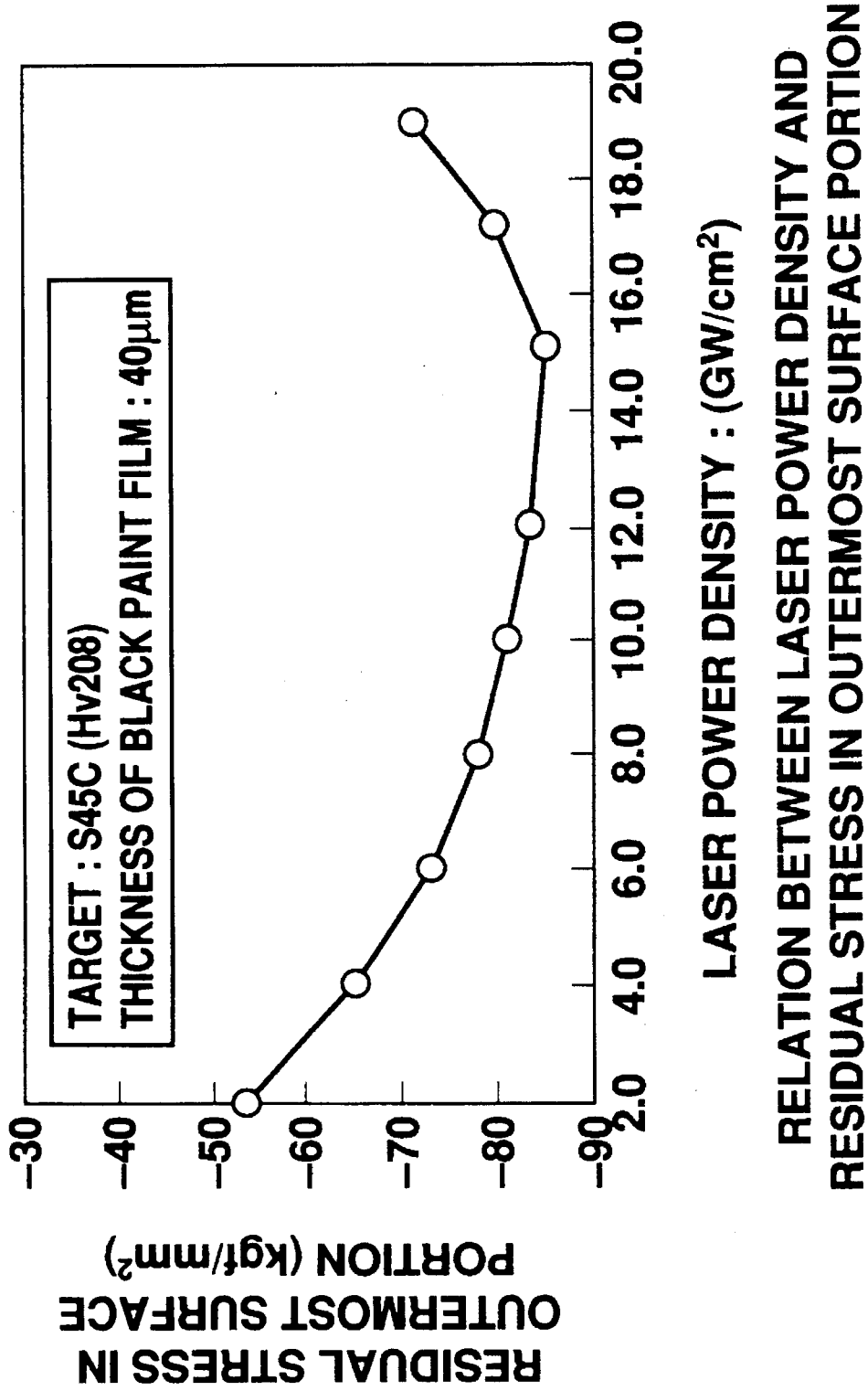
FIG. 7 is a diagram illustrating the relationship between the laser power density and the residual stress generated in the outermost surface.
Figure 8:
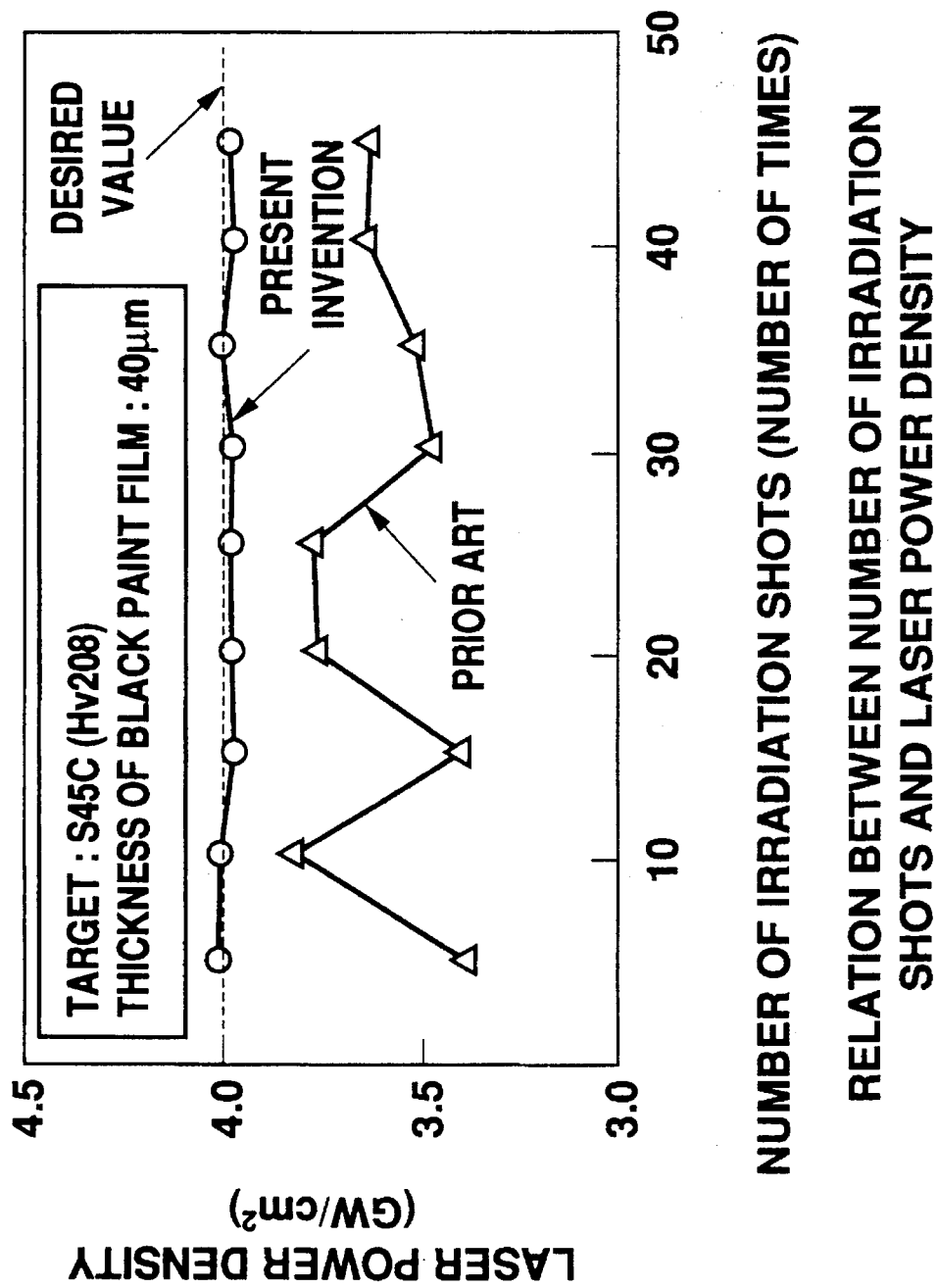
FIG. 8 is a diagram illustrating the relationship between the number of irradiation shots and the laser power density.

Next, the second embodiment of the present invention will be described hereunder by referring to FIGS. 6 to 8. FIG. 6 shows the configuration of this embodiment schematically. FIG. 7 shows the relation between the laser power density and the residual stress generated in the outermost surface portion of a metallic target. FIG. 8 shows the relationship between the number of irradiation shots of laser light and the laser power density.

As shown in FIG. 6, which illustrates the configuration of a device according to the second embodiment schematically, a laser oscillator 81, mirrors 82, 83 and 84, a metallic target 86, an absorbing coating material, overlays, a sensor 87a, a thickness gauge 87b, a coating spraying control unit 88 and a computer 89 have the same structures and functions as the corresponding members of FIG. 1.

Further, in the case of this embodiment, the focal distance of a collective lens 85 can be controlled by an automatic focal distance regulating unit 90a provided with a motor 90b. Namely, in the case of this embodiment, a total of the thicknesses of the film and the overlay is measured by the thickness gauge 87b. Further, data representing the total of the thicknesses is supplied to the computer 89. Then, the computer 89 calculates a position in the film, to which laser light is focused, on the basis of the data. Furthermore, the automatic focal distance regulating unit 90a controls the revolution operation of the motor 90b to regulate the relative position of the collective lens 85 with reference to the target 86. Thus, the focal distance is controlled. Consequently, the optimum laser irradiation power can be applied to the film at all times. Thereby, a predetermined shock can be applied to the target. Incidentally, the absolute position to which laser light is focused can be detected by sensing the position of the surface of the overlay, at which the thickness of the film is measured, from the position of the probe of the thickness gauge 87b. Further, the laser shock processing can be achieved effectively, because of the facts that the thickness of the film is controlled in such a manner to be held constant and that the focal distance is controlled as described above.

FIG. 7 illustrates the relationship between the laser power density and the residual stress generated in the outermost surface portion of the target. This figure shows that when the power density is in the 2 to 15 $GW/cm^2$ range, the compressive residual stress imparted to the target increases as the laser power density increases in this range and that in contrast, when the laser power density exceeds 15 $GW/cm^2$, the compressive residual densities decreases as the laser density power increases. Generally, the phenomenon in which as the laser density power increases the compressive residual stress decreases, is referred to as "over-peening". Further, when this phenomenon occurs, the position in the target, at which the compressive residual stress has a peak value, shifts from the outermost surface portion thereof to a slightly inner position. Thus, a decrease in compressive residual stress occurs in the compressive residual surface portion thereof.

FIG. 8 illustrates the relationship between the number of irradiation shots of laser light and the laser power density. In the case of an example of the prior art, it has been observed that the laser power density decreases by about 18% of the desired value (4.0 $GW/cm^2$) thereof. In the contrast, in case of the method of the present invention, reduction in the laser power density is not more than 2%. Namely, as is seen from FIG. 7, the 18% reduction of the laser power density corresponds to about a 4 $kgf/mm^2$ reduction of the residual stress. Thus, it is conjectured that the reduction in the laser power density has a great effect on reduction in the fatigue strength of the target. Therefore, it is found that the desired residual stress can be imparted uniformly to the target by controlling, namely restraining, variations of the laser power density.

Figure 9:
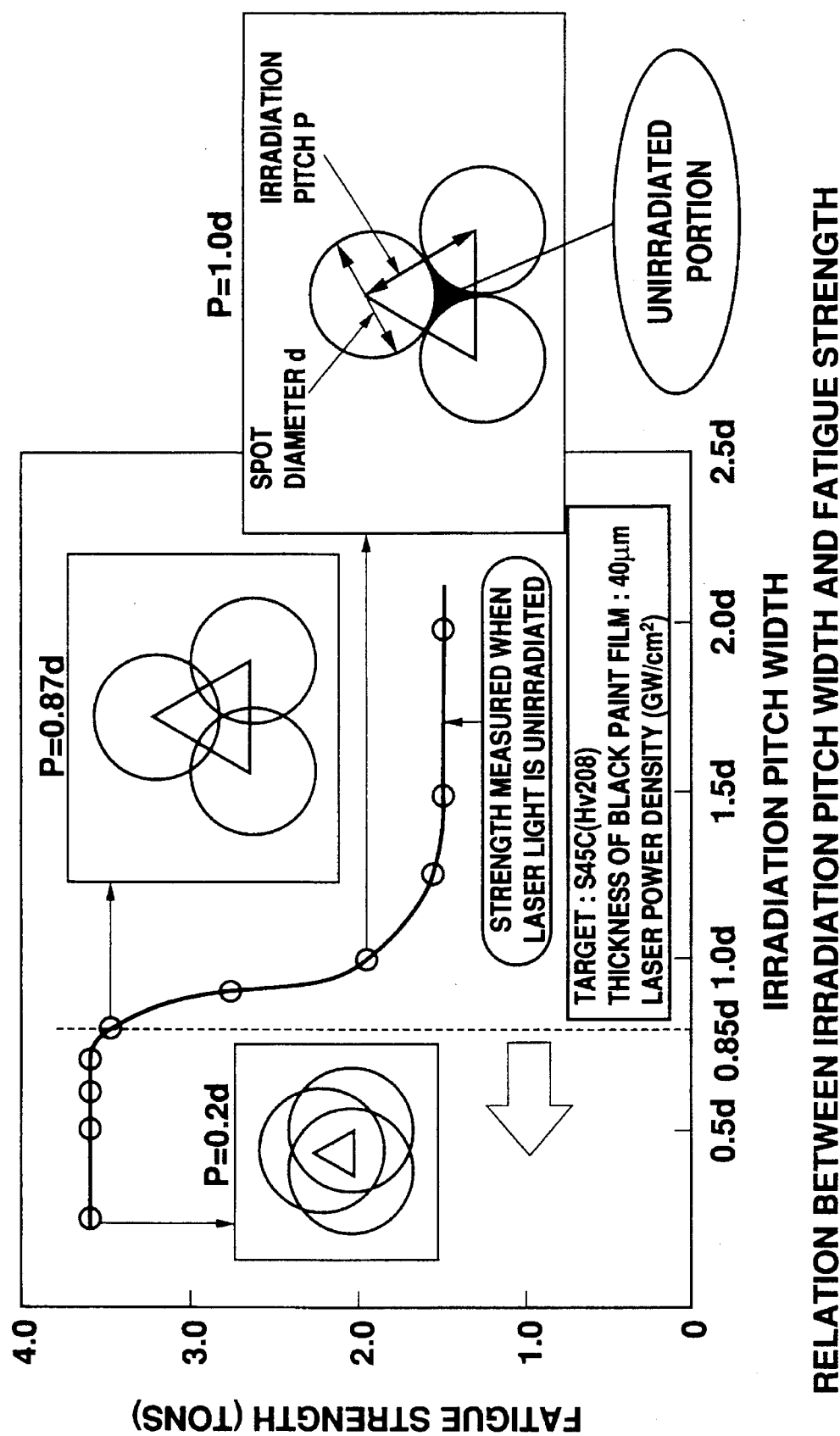
FIG. 9 is a diagram illustrating the relationship between the irradiation pitch width and the fatigue strength.

FIG. 9 is a characteristic diagram for illustrating the relationship between the laser irradiation pitch width and the fatigue strength in the case of applying the method of the present invention to a connecting rod which is a component part of an engine for use in a motor vehicle.

in a case where the irradiation pitch width P exceeds 0.87 d (incidentally, character "d" denotes a laser spot diameter), for example, in the case that P=1.0 d, there remains a portion not irradiated with laser light, as indicated by the shaded area in FIG. 9. Thus, there is little difference between the fatigue strength of a processed target and that of a target not irradiated with laser light. In contrast, in a case where the irradiation pitch width P is not more than 0.87, for instance, in the case that P=0.2 d, there remains no portion that is not irradiated with laser light. Further, partially overlapping irradiations of laser light performed continuously on the surface of the target exert an effect on a deeper portion in the target. Consequently, a considerable increase in the fatigue strength can be achieved uniformly in the processed surface of the target.

Therefore, it is found that the fatigue strength can be increased uniformly in the processed surface of the target by setting the irradiation pitch width to be equal to or less than about 0.85 times the laser spot diameter (size).

Figure 10:
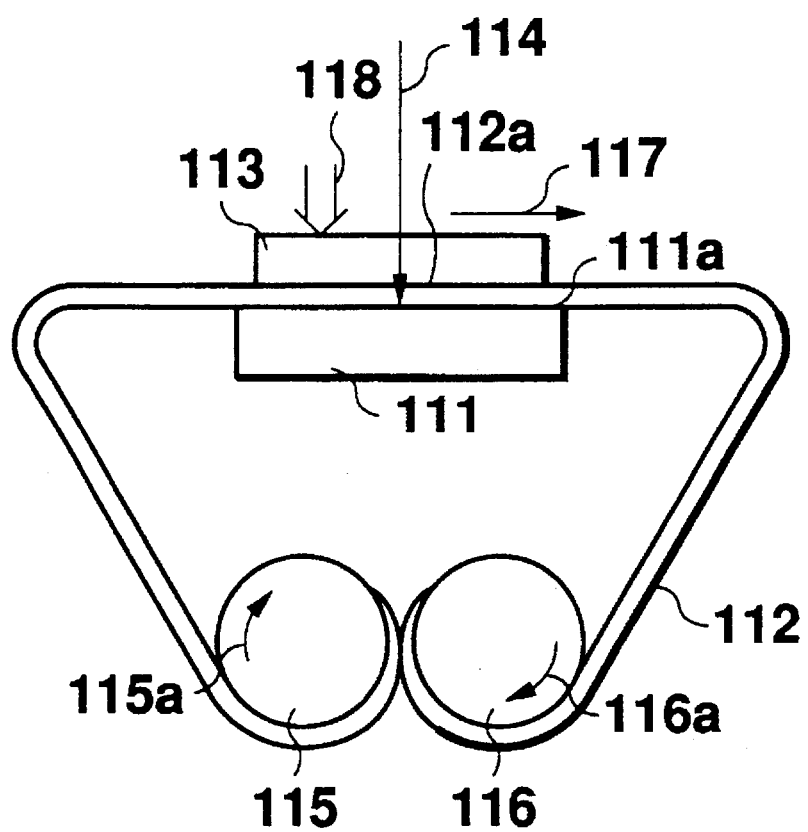
FIG. 10 is a diagram illustrating the configuration of a third embodiment of the present invention.
Figure 11:
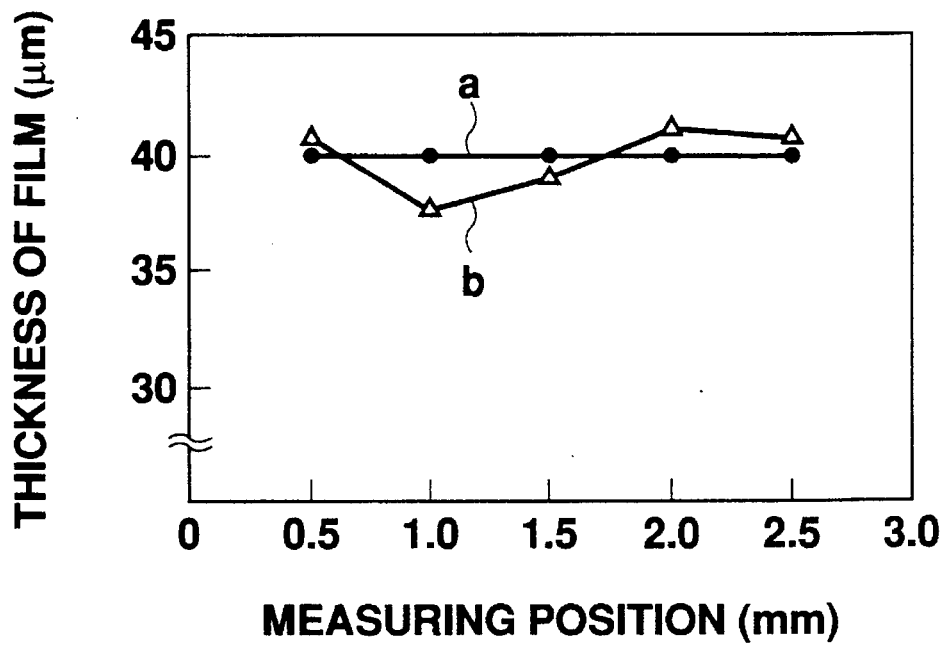
FIG. 11 is a diagram illustrating conditions for the third embodiment of the present invention.
Figure 12:
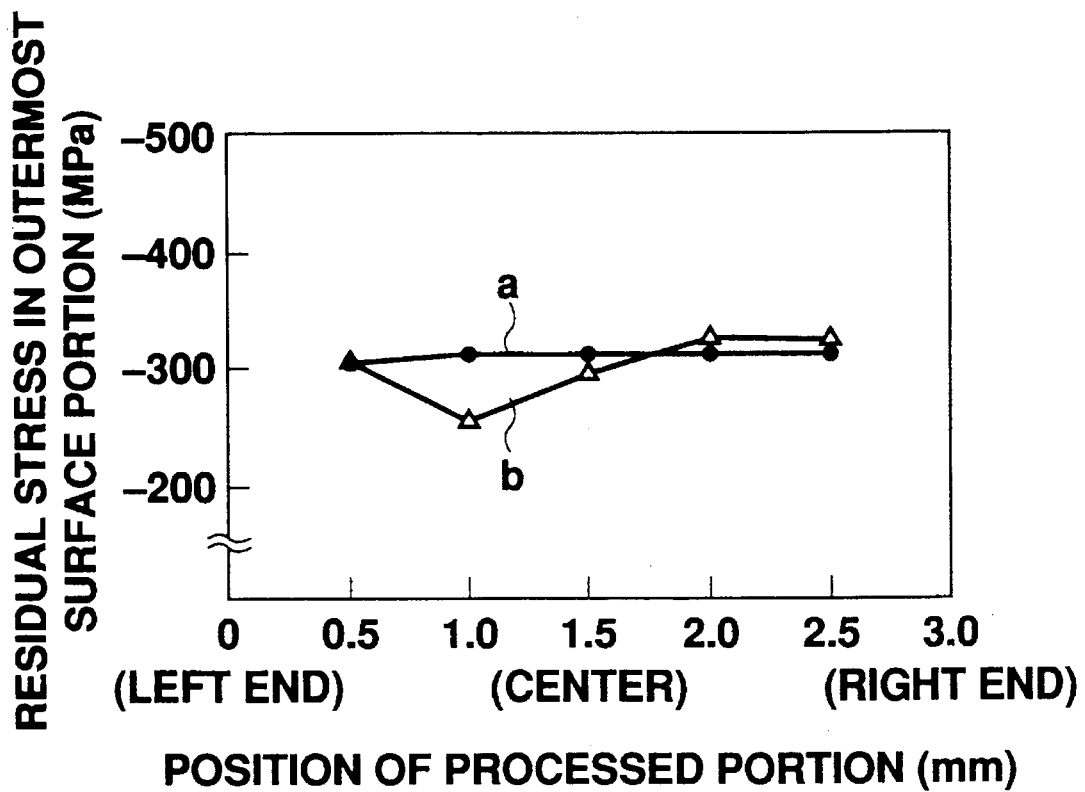
FIG. 12 is a diagram illustrating the characteristics of the third embodiment of the present invention.

Next, the third embodiment of the present invention will be described hereinafter by referring to FIGS. 10 to 12. FIG. 10 illustrates the configuration of the third embodiment schematically. FIG. 11 illustrates the thicknesses of a coating or film used in the third embodiment. FIG. 12 illustrates the residual stress in the case of the third embodiment.

In case of the third embodiment of FIGS. 10 to 12, a black film 112 (40 μm in thickness) is placed on the flat top surface 111a of the metallic workpiece 111, as shown in FIG. 10. Incidentally, the film 112 is made of a kind of a film-like laser light absorbing material (to be described later).

The workpiece 111 is made of quenched and tempered steel Scr430. Further, the film 112 consists of 80 wt % resin (a mixture of alkyd resin and cellulose nitrate), 11 wt % additive (paraffin wax) and 9 wt % pigment (a mixture of carbon and barium sulfate). Moreover, the width of the film 112 is approximately 25 mm. Furthermore, the film 112 is wound on a first reel 115 and is arranged in such a manner that it can be successively taken up to a second reel 116. Incidentally, reference character 115a designates the direction of rotation of the first reel 115; 116a the direction of rotation of the second reel 116; and 117 the direction in which the film 112 is fed.

Further, a transparent acrylic plate 113 serving as a light transparent member is mounted on the top surface 112a of the film 112 (especially, a part thereof corresponding to the workpiece 111), as viewed in FIG. 10. The horizontal dimensions of the acrylic plate 113 are about 40 mm×25 mm, as viewed in this figure. Reference numeral 118 designates the direction of the force (1 to 3 $kgf/cm^2$) applied to the acrylic plate 113.

Laser light pulse 114 is Nd:YAG laser light. Further, in the case of this laser light pulse, the wavelength is 1.0 μm; the pulse energy 1.4 J; the pulse width 10 nsec; the period 0.1 sec; the spot diameter (size) is 3 mm; and the power density (namely, the minimum power density required for generating a shock wave of pressure) 2 $GW/cm^2$. The laser light pulse 114 is transmitted by the acrylic plate 113. Then, the top surface 112a of the film 112 is irradiated with the laser light pulse 114.

In the above described configuration, when the top surface 112a of the film 112 (the part thereof corresponding to the work 111) is irradiated through the acrylic plate 113 with the laser light pulse 114, the laser light pulse 114 is absorbed by the film 112. As a result, the surface portion 112a of the film 112 is evaporated. Then, this evaporation gas expands. However, the evaporation gas is restrained by the acrylic plate 113 from expanding upwardly, as viewed in FIG. 10. Thus, the shock wave generated owing to an abrupt change in pressure is applied to the top surface 111a of the workpiece 111.

Moreover, compressive residual stress is generated in the surface portion 111a of the workpiece 111 by this shock wave. Furthermore, in this case, the operations of applying and drying of the laser light absorbing coating as performed in the prior art become unnecessary. Further, a large number of irradiations of the laser light pulses 114 onto the same portion of the surface of the workpiece 111, as well as the continuous irradiation of the laser light pulse 114 onto a large area of the surface of the workpiece 111, can be achieved efficiently, because of the fact that the film 112 can be fed forward. Namely, in a state in which the acrylic plate 113 is moved upwardly and is thus detached from the surface of the film 112, the film 112 is fed forward and thereafter the laser shock processing can be performed again on another part of the film 12.

In this case, as is indicated by a polygonal line a in FIG. 11, the thickness of the film 112 (corresponding to the thickness of the coating) is even. Thus, uniform residual stress is generated as indicated by a polygonal line a in FIG. 12. Thereby, the fatigue strength of the workpiece 111 is uniformly increased. Incidentally, local residual stress is measured by x-rays by using a 0.15 mm diameter collimator and a chrome tube lamp. Further, in FIGS. 11 and 12, polygonal lines b indicate the characteristics of an example of the prior art. As shown in these figures, in the case of the example of the prior art, the thickness of a coating varies with portions of the workpiece. Namely, the thickness of the coating is not even. Thus, residual stress imparted to the workpiece is not uniform.

Figure 13:
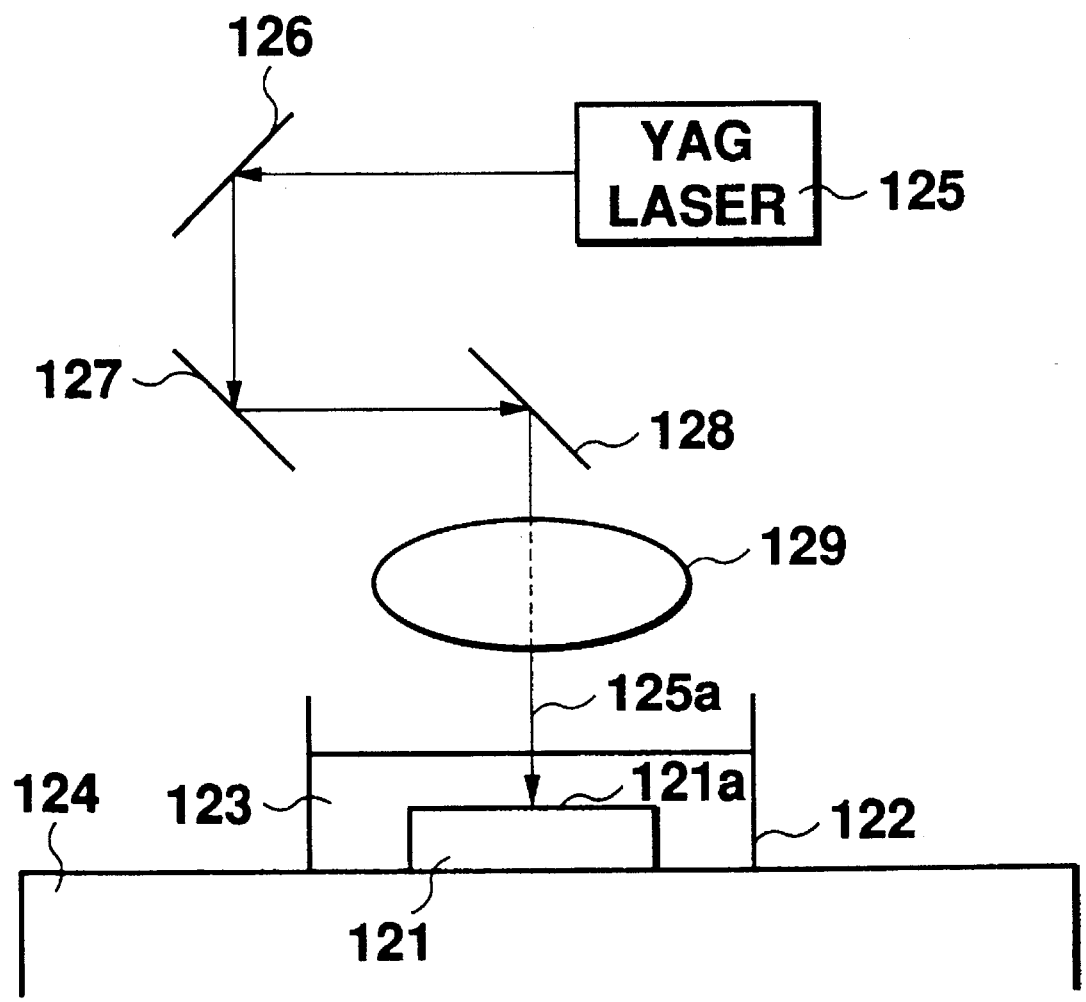
FIG. 13 is a diagram illustrating the configuration of a fourth embodiment of the present invention.

Next, the fourth embodiment of the present invention will be described by referring to FIG. 13. In the configuration of FIG. 13, a metallic workpiece (a test piece) 121 is chemically polished. Further, conditions for chemical polishing are as follows (1) Polishing liquid is mixed liquid of 1 mol/l hydrogen fluoride (HF) and 2 mol/l hydrogen peroxide ($H_2O_2$).

(2) Temperature of the polishing liquid is 40 degrees centigrade.

(3) Polishing time is 3 minutes.

Moreover, the workpiece 121 is placed in distilled water 123 stored in a water receptacle 122. The top surface 121a of the workpiece 121 is coated with a film-like laser light absorbing material coating for absorbing laser light pulses (not shown). The components of this coating are the same as the components of the film 112. Further, this coating is directly applied to the top surface 121a of the workpiece 121 over and over again and is 4.0 μm in thickness. Incidentally, the water receptacle 122 is mounted on a rest 124.

Furthermore, a YAG laser 125 produces a laser light pulse 125a. Further, in the case of this laser light pulse, the wavelength is 1.06 μm; the pulse energy 1.4 J; the pulse width 10 nsec; and the power density 5 $GW/cm^2$. The laser light pulse 125a is successively reflected by a first mirror 126, a second mirror 127 and a third mirror 128, in this order. Then, the reflected laser light pulse is focused by a convex lens (a focusing lens) 129. Subsequently, the focused laser light pulse is applied through the distilled water to the coating formed on the top surface 121a of the workpiece 121.

In the above described configuration of this embodiment, the surface roughness of the surfaces (including the top surface 121a) of the workpiece 121 is improved by the chemical polishing. And Intergranular oxidation layer by carburizing is removed by the chemical polishing. Consequently, shocks caused by the laser light pulse 125a can be also made to be uniform.

Next, the surface portion of the coating applied to the top surface 121a of the workpiece 121 is evaporated by the shock due to the laser light pulse 125a. Then, this evaporation expands. Further, the distilled water 123 carries out the functions similar to those of the acrylic plate 113 of the third embodiment. As a result, similarly to case of the third embodiment, compressive residual stress is generated in the workpiece 121. Consequently, the fatigue strength of the workpiece 121 can be substantially increased.

Figure 14:
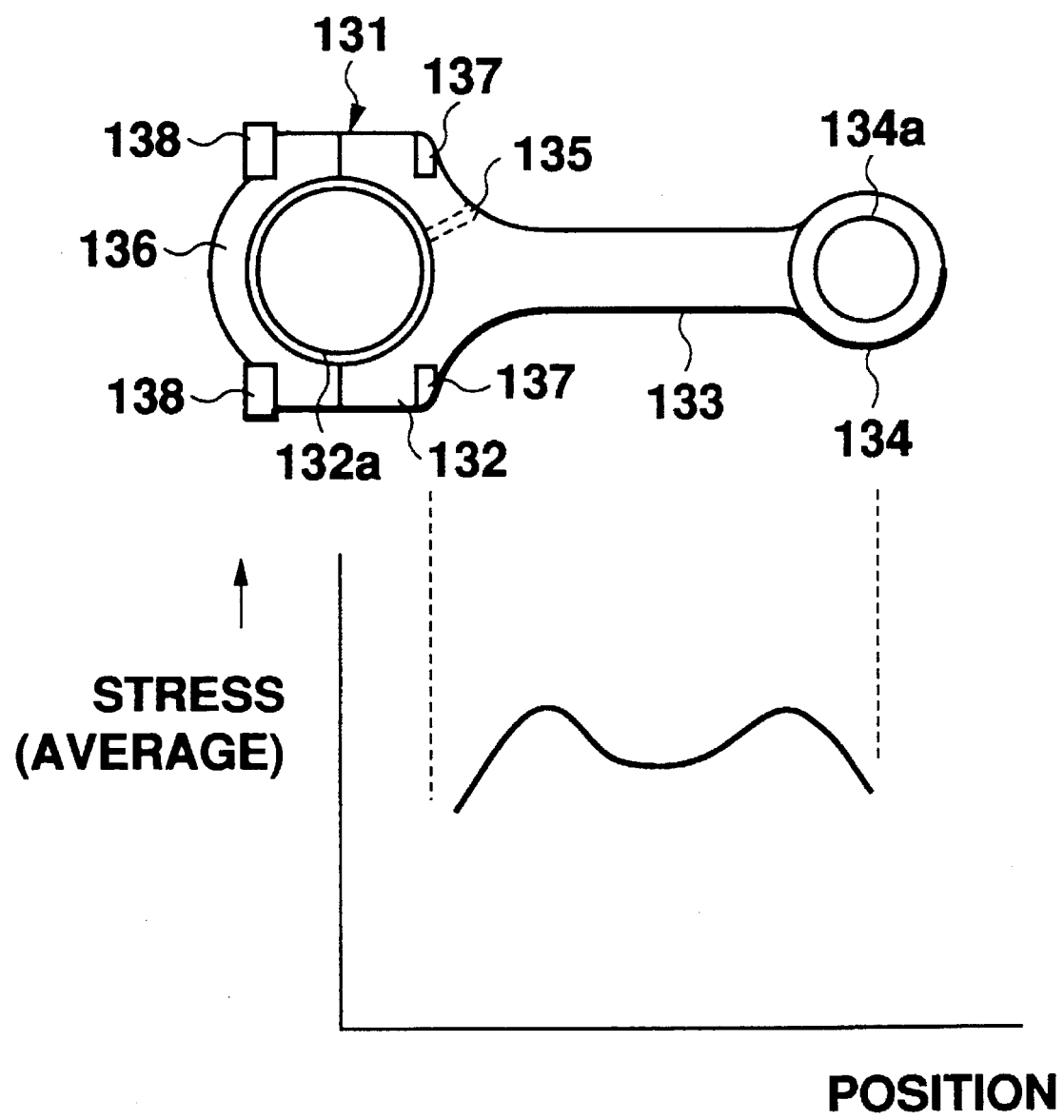
FIG. 14 is a diagram illustrating the configuration of the fourth embodiment of the present invention.

Next, the fifth embodiment of the present invention will be described by referring to FIG. 14. Further, an upper half of FIG. 14 illustrates a view of a connecting rod 131 which is a component for use in an engine of a motor vehicle. Moreover, a lower half of FIG. 14 illustrates the distribution of the stress generated in portions in the horizontal direction of the connecting rod when the engine works.

As shown in this figure, the connecting rod 131 consists of a large end portion 132, a column portion 133 and a small end portion 134. Further, a cap 136 is fixed to the large end portion 132 by bolts 137 and nuts 138. Incidentally, reference numeral 185 designates an oil hole bored through the large end portion 132.

After the connecting rod 131 is machined and formed into a predetermined shape, the inner surface 132a of the large end portion 132 and the inner surface 134a of the small end portion 134 are masked. Then, unmasked portions of the connecting rod 131 are chemically polished. Thereafter, laser shock processing is performed under specific conditions (which will be described below) on surface parts onto which the stress tends to be concentrated, namely, a side surface part of the boundary between the large end portion 132 and the column portion 133, a surface part in the vicinity of the oil hole 135 bored through the large end portion 132 and a side surface part of the boundary between the small end portion 134 and the column portion 133. Incidentally, laser light pulses used in this processing are the same as those used in the fourth embodiment and are applied to parts onto which the stress is concentrated.

Further, the components of the film-like laser light absorbing material coating (40 μm in thickness) are the same as those of the coating of the fourth embodiment. This film-like laser light absorbing material coating is applied to the portions of the connecting rod 131, on which the laser shock processing has been performed. Furthermore, similarly to the case of the fourth embodiment, distilled water is used as an overlay for an adiabatic fixing of the rod.

In the graph of FIG. 14, the horizontal axis corresponds to the horizontal positions of various portions of the connecting rod 131 as illustrated in the upper half of this figure. Further, the vertical axis represents the stress acting on the portions of the connecting rod 131 during the working of the engine.

Figure 15:
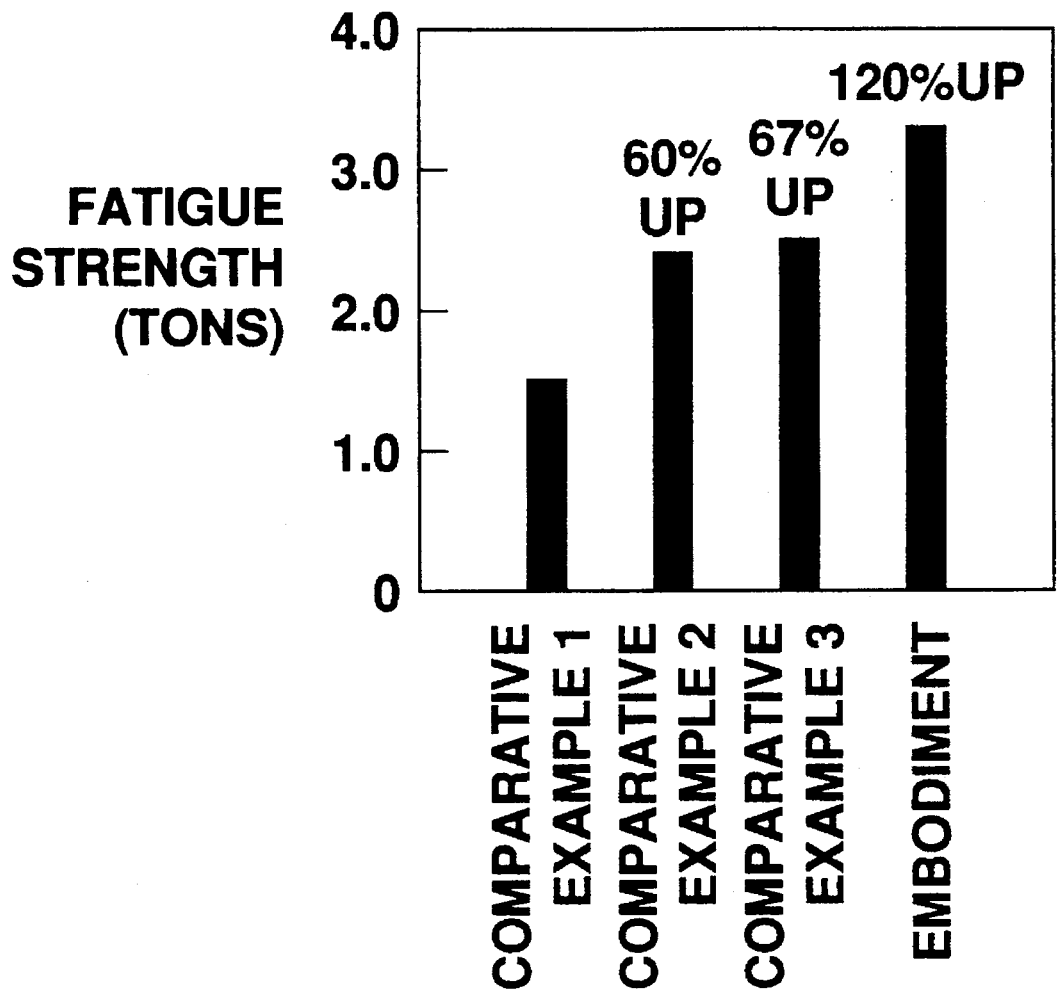
FIG. 15 is a diagram illustrating the characteristics of the fourth embodiment of the present invention.

FIG. 15 illustrates the comparison among the fatigue strengths of the connecting rod processed by performing the prior art methods and the fatigue strength thereof obtained by performing the method of the fifth embodiment. In this figure, Comparative Examples 1 to 3 represent data obtained by performing the prior art methods. More particularly, Comparative Example 1 represents data obtained in case where only machining has been performed on the rod. Further, Comparative Example 2 represents data obtained in case where chemical polishing has been performed thereon after the machining. Moreover, Comparative Example 3 represents data obtained in case where shot peening has been performed thereon after the machining. Furthermore, Embodiment represents data obtained in case where, after the machining and the subsequent chemical polishing, laser shock processing has been further performed thereon. In the case of Embodiment, the surface roughness is small and the residual stress is large. Additionally, the fatigue strength is measured by a fatigue test machine of the mechanical resonance type that carries out a fatigue test by reversing the direction, in which a load is imposed, $10^7$ times at the frequency of 30 Hz.

Further, Table 2 listed below shows the values of the surface roughness and of the residual stress at the outermost surface portion of the connecting rod in each of the cases.

TABLE 2

|  | Surface Roughness | Residual Stress |
| --- | --- | --- |
| Comparative Example 1 | 70 μmRz | 0 kgf/mm$^2$ |
| Comparative Example 2 | 3.5 μmRz | 0 kgf/mm$^2$ |
| Comparative Example 3 | 75 μmRz | −36 kgf/mm$^2$ |
| Embodiment | 3.5 μmRz | −36 kgf/mm$^2$ |

As is seen from the comparison between Comparative Example 1 and Comparative Example 2, the surface roughness (more accurately, the average of the values thereof observed at 10 positions) is decreased to 3.5 μmRz by performing the chemical polishing. Further, as is seen from the comparison between Comparative Example 2 and Embodiment, such a value of the surface roughness is maintained upon completion of the laser shock processing subsequent to the chemical polishing.

Moreover, as is seen from the comparison between Comparative Example 3 and Embodiment, the laser shock processing can impart the residual stress of the same level (−36 kgf/mm$^2$ at the outermost surface portion) as of that imparted by the shot peening processing. Furthermore, it is apparent from the comparison between Example 1 and Example 3 that the surface roughness is degraded by the shot peening processing. In contrast, it is clear from the comparison between Comparison Example 2 and Embodiment that the surface roughness is not degraded by the laser shock processing.

Incidentally, the surface roughness and the residual stress obtained by further performing shot peening processing on the rod of Comparative Example 2 are equal to those obtained by further performing shot peening processing on the rod of Comparative Example 1, respectively.

As shown in FIG. 15, the fatigue strengths respectively corresponding to Comparative Examples 1, 2 and 3 are 1.5 tons, 2.4 tons and 2.5 tons. In contrast, the fatigue strength obtained in the case of Embodiment is 3.3 tons. Thus, this embodiment of the present invention has the fatigue strength which is far superior to that obtained by the prior art method. The fatigue test has revealed that in cases of Comparative Examples 1 to 3, a rupture takes place at parts onto which the stress is concentrated, namely, at the boundary between the small end portion 134 and the column portion 133, or at the inner surface of the oil hole 135, while on the other hand, in the case of Embodiment, a rupture occurs at the inner surface 134a of the small end portion 134. This proves that the strengthening of objective parts of the rod, which should be reinforced by the method of this embodiment, is sufficiently achieved. In the case of Embodiment, the fatigue strength increases about 1.8 tons in comparison with Comparative Example 1 (namely, there is a 120% increase in fatigue strength). This value (1.8 tons) of the increase in fatigue strength is nearly equal to a sum of the increase (0.9 tons (=2.4 tons−1.5 tons)) in fatigue strength in the case of Comparative Example 2, which is associated with the decrease in surface roughness, and the increase (1.0 tons (=2.5 tons−1.5 tons)) in fatigue strength in the case of Comparative Example 3, which is attended with the impartation of the residual stress. This suggests that the embodiment of the present invention can benefit from both the effects of improving the surface roughness and of imparting the compressive residual stress.

Next, another embodiment of the present invention will be described hereunder. The sixth embodiment of the present invention utilizes the laser shock processing in order to improve the abrasion resistance of a flame spraying coat formed on a base material.

Previously, a method of forming a sprayed coating on a surface of a metallic material by flame spraying has been performed to improve or reform the surface thereof. Further, Japanese Patent Public Disclosure Official Gazette (Kokai Koho) No. 5-271900/1993 discloses that compressive residual stress is imparted to a sprayed coating by performing a shot peening process on the sprayed coating and thereby, the adhesion strength of an adhesive bond between the sprayed coating and a base metal is increased, and in contrast, the number of pores is decreased. This method, however, has a drawback in that the surface of the sprayed coating becomes rough, because the shot peening process is a process of blowing hard particles (ceramic particles) on the sprayed coating to pressurize the sprayed coating.

Therefore, in the case of this embodiment, the laser shock processing is employed instead of the shot peening. Hereinafter, this embodiment will be described by referring to the accompanying drawings.

In the case of this embodiment, a sprayed coating is formed on an aluminum alloy cylinder block which is used in an internal combustion engine of a vehicle. Then, the laser shock processing is performed on the sprayed coating. Incidentally, AC2C, A390 or the like may be employed as the aluminum alloy.

Figure 18:
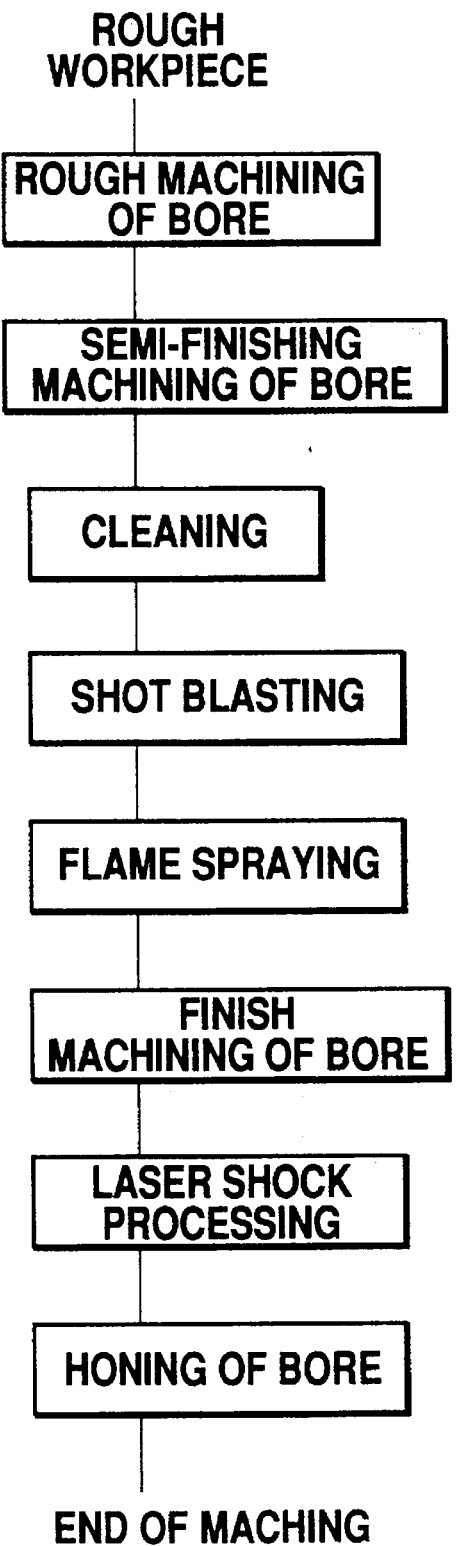
FIG. 18 is a flowchart illustrating the machining process to be performed on a cylinder block.

FIG. 16 is a diagram illustrating the configuration of a unit for performing flame spraying on a cylinder block. FIG. 17 is a diagram illustrating the configuration of a unit for performing the laser shock processing. FIG. 18 is a flowchart illustrating the entire machining process.

As illustrated in FIG. 16, a flame spraying processing is performed by spraying powder on the inner surface 202 of a bore formed in a cylinder block 201, from a spraying nozzle 213. As shown in FIG. 16A, the spraying nozzle 213 has a configuration in which a needle-like tungsten electrode 16 is provided in the central portion of a metallic casing 215. Further, a gas inflow port 215a is provided in a base or root side portion of the casing 215, and a powder inflow port 215b is provided in a tip end portion thereof. Moreover, a nozzle spout 215c is provided at the tip end of the casing.

Thus, gas is introduced from the gas inflow port 215a through such a spraying nozzle 213 into the casing 215. Then, the gas flows in the casing 215 at a high speed. When feeding powder from the powder inflow port 215b into the casing, the powder is sucked into the high-speed gas flow, owing to the tapered shape of the inner space of the casing 215. On the other hand, a predetermined high frequency voltage is applied across the tungsten electrode 216 and the casing 215. Thus plasma is generated in the tip end portion of the nozzle. Further, the gas flow containing the powder is injected therefrom as a plasma jet 214.

Further, the powder can be sprayed on a desired portion by turning the tip end of the spraying nozzle 218 in a desired direction. In the case of this example, the powder is sprayed on the entire inner surface of the cylinder block 201 by turning around and vertically moving the spraying nozzle 213.

Moreover, as shown in FIG. 17, the unit for performing the laser shock processing consists of a laser light source 221, a mirror 222a for reflecting laser light emitted from this laser light source, a collective lens (namely a converging lens) 223 and a mirror 222b. Furthermore, a predetermined portion 203 of the inner surface of the cylinder block 1 is irradiated with laser light, which is emitted from the laser light source 221, through the mirror 222a, the converging lens 223 and the mirror 222b.

On the other hand, a black coating is applied to the portion 203 of the inner surface 202 of the cylinder block 201 as an absorbing coating. Further, a light transmitting overlay is provided on the black coating. The black coating is vaporized by being irradiated with laser light and thus the laser shock processing is performed.

Next, the machining process will be described hereinbelow with reference to FIG. 18. First, a rough boring (namely, the rough machining of a bore) is performed on a rough workpiece which is roughly shaped like the cylinder block. Subsequently, semi-finishing machining is performed on a bore formed in the workpiece. The workpiece is then washed and thereafter the surface of the workpiece is cleaned by performing a shot blasting processing.

Thus, when the inner surface of the bore formed in the cylinder block becomes clean as a result of the shot blasting process, a plasma flame spraying processing is performed on the surface of the bore. For example, mixed powder made by mixing Si powder containing 15% Al (the diameter of each particle is not more than 1500 mesh) with C powder containing 0.8% Fe (the diameter of each particle is not more than 1500 mesh) at a ratio of one to one is employed as the powder used in the plasma flame spraying processing. Further, the thickness of the sprayed coating or layer is, for instance, 0.5 mm.

Furthermore, to maintain the precision of the cylinder block 201, the processing temperature is set at a value which is not higher than 150 degrees centigrade. Further, the diameter of each particle of the powder used in the flame spraying is set at a value which is not larger than 10 μm, so that the velocity of molten powder particles contained in the plasma jet 14 is increased. Thereby, the adhesion and the peeling resistance of the layer or coating sprayed on the cylinder block 201 are ensured.

Then, finish machining is performed on the inner surface of the bore. Thereafter, the laser shock processing is performed on the sprayed coating to impart compressive residual stress thereto and to improve the abrasion resistance thereof.

This laser shock processing is carried out by irradiating the portion 203 of the inner surface 202 of the bore, which requires the abrasion resistance, with laser pulses after the absorbing coating material and the overlay are applied thereto.

At that time, this laser shock processing is effected, for instance, on the following conditions.

Namely, Nd:YAG laser light, of which the wavelength is 1.06 μm, the pulse energy is 1.4 J and the pulse width is 10 nsec, is used. The spot diameter or size of this laser light is regulated by using the mirrors 22a and 22b and the converging lens 23 in such a manner that the power density becomes 2 GW/cm$^2$. Further, the black coating or paint consists of 80 wt % resin (namely, a mixture of alkyd resin and cellulose nitrate), 11 wt % additive (namely, paraffin wax) and 9 wt % pigment (namely, a mixture of carbon and barium sulfate). Furthermore, the black coating is sprayed at a spraying air pressure of 4 kgf/cm$^2$ or so. Moreover, the thickness of the sprayed coating is 50 μm. Additionally, the overlay made of clear lacquer of the nitrocellose lacquer type is used and is sprayed at a spraying air pressure of 4 kgf/cm$^2$.

In this case, it is preferable that the thickness of the black coating is accurately controlled by performing a feedback control operation by means of the device as employed in the previously described embodiment of the present invention. Further, any of the methods of the first to fifth embodiments may be employed to perform the laser shock processing.

Figure 19:
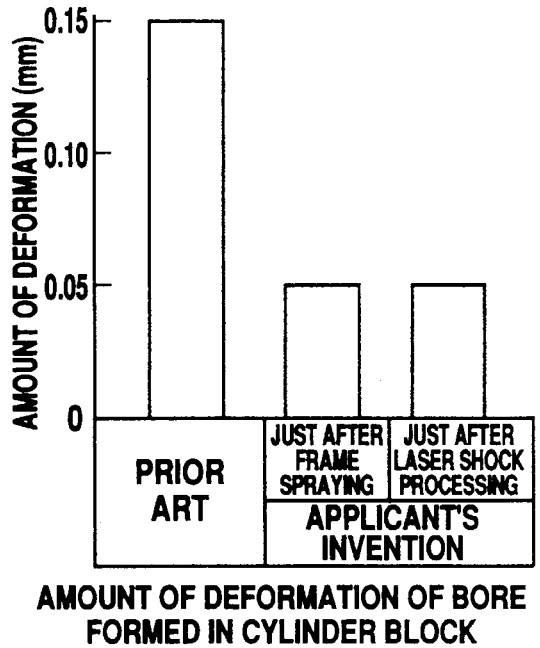
FIG. 19 is a diagram illustrating the amount of deformation of a bore formed in the cylinder block.

Upon completion of the laser shock processing of the inner surface of the bore in this way, the coating and so on are removed. Then, the inner surface of the bore is finished by honing the inner surface thereof with a hone. FIG. 19 shows the amount of deformation of the bore formed in the cylinder block. Here, the difference between the maximum value and the minimum value of the diameter of the bore in the circumference, namely, the transverse section thereof, is defined as the amount of deformation of the bore. As is seen from this figure, in accordance with the present invention, the amount of deformation of the bore can be 0.05 mm. Incidentally, in the case of the comparative example of FIG. 19, the adhesion of the sprayed coating is improved by rasing the processing temperature up to 200 degrees centigrade. When the processing temperature is raised to 200 degrees centigrade as shown in this figure, the amount of deformation of the bore increases. Therefore, this proves that the amount of deformation of the bore can be reduced by setting the processing temperature at a value which is not higher than 150 degrees centigrade, as in the case of this embodiment.

Figure 20:
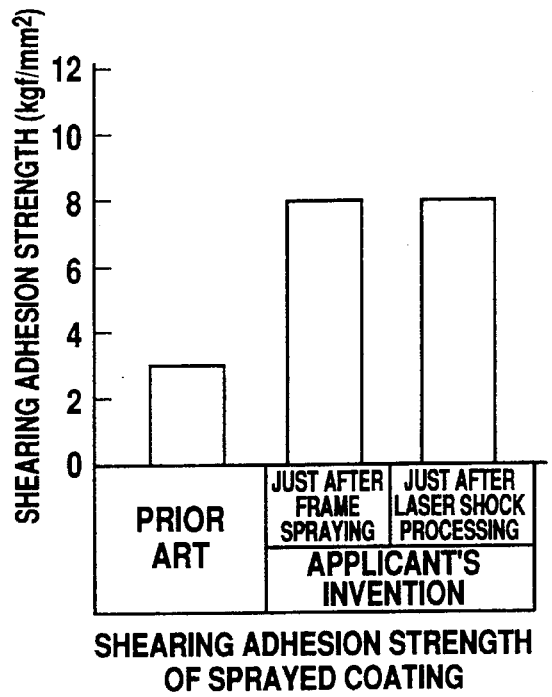
FIG. 20 is a diagram illustrating the shearing adhesion strength of a sprayed coating.
Figure 21:
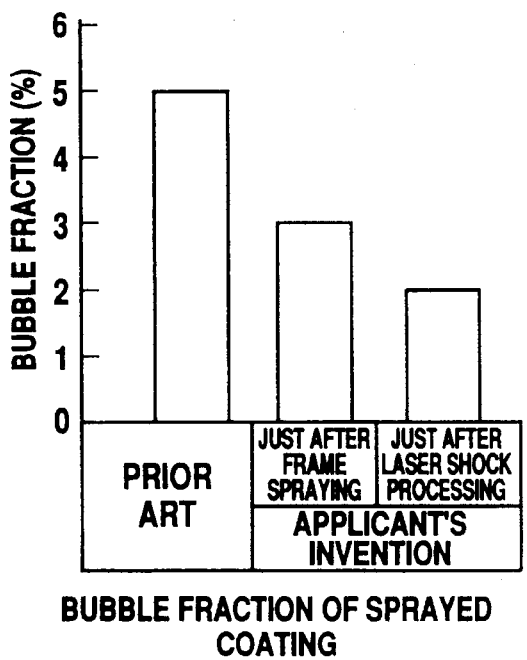
FIG. 21 is a diagram illustrating the bubble fraction of the sprayed coating.

FIG. 20 illustrates the shearing adhesion strength of the sprayed coating. Further, FIG. 21 illustrates the bubble fraction of the sprayed coating. In the case of this embodiment of the present invention, the diameter of each particle of the powder used in the flame spraying is set at a value which is not larger than 10 μm, so that the sprayed coating becomes dense or compact. Thereby, the shearing adhesion strength can have a large value of 8 kgf/mm$^2$ and the bubble fraction can have a small value of about 5%. In the case of the comparative example, powder having a relatively large particle diameter (or grain size) is used. In this case, the shearing adhesion strength can have a small value of 3 kgf/mm$^2$ or so and the bubble fraction can have a large value of about 5%.

Moreover, in the case of this embodiment, when forming the sprayed coating, powder having a particle size or diameter of 10 μm is used in the early stage. Thereafter, powder having a particle size of 3 to 5 μm is used. Thus, the powder having a large particle size is combined with the powder having a small particle size. Consequently, the adhesion strength of an adhesive bond between the sprayed coating and the base metal can be further increased.

Figure 22:
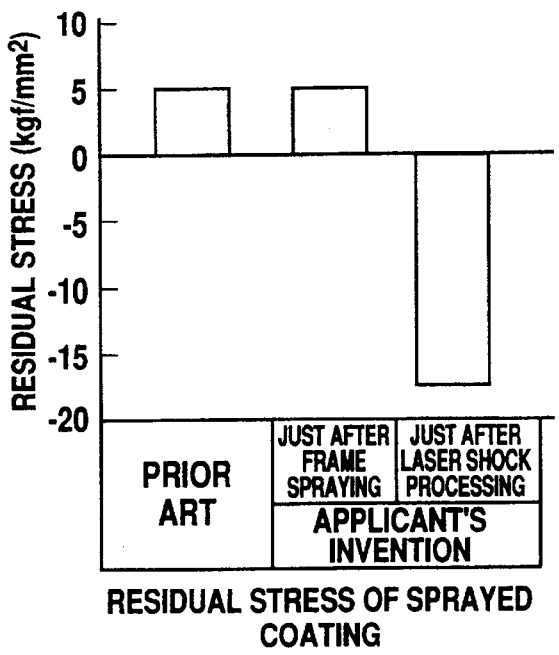
FIG. 22 is a diagram illustrating the residual stress generated in the sprayed coating.
Figure 23:
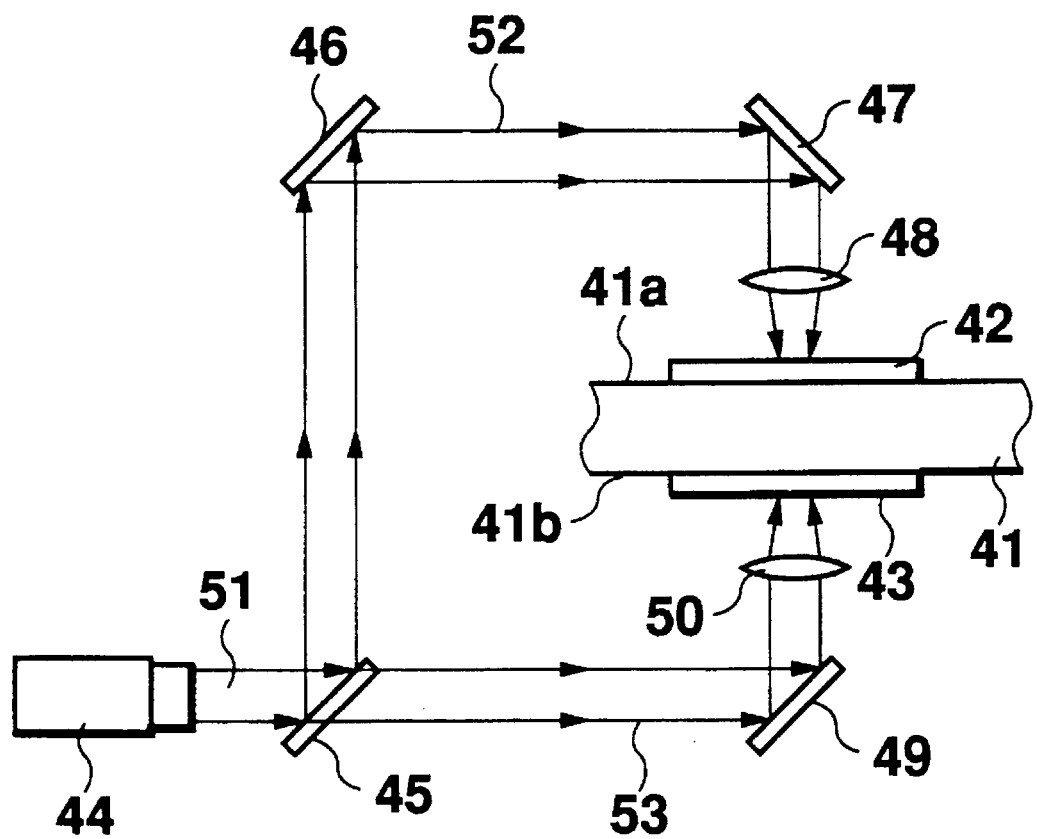
FIG. 23 is a diagram illustrating the configuration of a device of the prior art.

FIG. 22 illustrates the residual stress occurring in the sprayed coating. As can be seen from this figure, large compressive residual stress of −17 kgf/mm$^2$ can be imparted to the sprayed coating. Generally, the larger the residual stress is, the higher the abrasion resistance becomes. Thus, in the case of this embodiment, large abrasion resistance can be obtained. Moreover, when performing the laser shock processing, a shock wave is obtained by evaporating the coating. Therefore, the laser shock processing does not exert an adverse influence on the surface roughness at all. Consequently, the abrasion resistance can be significantly improved, maintaining the high-precision surface roughness.

Although the preferred embodiments of the present invention have been described above, it should be understood that the present invention is not limited thereto and that other modifications will be apparent to those skilled in the art without departing from the spirit of the invention. For example, the laser shock processing may be performed by using the black film of the fourth embodiment after the chemical polishing.

The scope of the present invention, therefore, should be determined solely by the appended claims.

What is claimed is:

1. A laser shock processing method for evaporating a light absorbing material by irradiation of laser light and for applying a shock to a metallic workpiece by utilizing an increase in pressure due to evaporation of the light absorbing material, comprising the steps of:

forming a light absorbing material layer for absorbing laser light, on a surface of a metallic workpiece, while simultaneously measuring a thickness of the light absorbing material layer, and performing a control operation that controls the thickness of the light absorbing material layer;

covering the formed light absorbing material layer with a light transmitting member layer; and irradiating the light absorbing material layer with a laser light pulse through the light transmitting member layer.

2. The laser shock processing method according to claim 1, wherein the step of forming a light absorbing material layer comprises the sub-steps of:

spraying the absorbing material on the surface of the metallic workpiece and forming an absorbing material layer; and performing a feedback control operation on a quantity of the absorbing material to be sprayed, according to the measured thickness of the absorbing material layer.

3. The laser shock processing method according to claim 2, wherein the sub-step of forming the absorbing material layer is performed by drying the sprayed absorbing material.

4. The laser shock processing method according to claim 1, wherein the thickness of the light absorbing material layer is changed in accordance with portions of the metallic workpiece.

5. A laser shock processing method for evaporating a light absorbing material by irradiation of laser light and for applying a shock to a metallic workpiece by utilizing an increase in pressure due to evaporation of the light absorbing material, comprising the steps of:

forming a light absorbing material layer for absorbing laser light, on a surface of a metallic workpiece;

covering the formed light absorbing material layer with a light transmitting member layer; and irradiating the light absorbing material layer through the light transmitting member layer with a laser light pulse while simultaneously regulating a focal distance of focusing means corresponding to the laser light.

6. The laser shock processing method according to claim 5, wherein the step of irradiating the light absorbing material layer with the laser light pulse includes the sub-step of regulating a focal distance of a collective lens for converging the laser light pulse, by moving the position of the collective lens by means of a motor.

7. The laser shock processing method according to claim 6, wherein the step of irradiating the light absorbing material layer with the laser light pulse includes the sub-steps of:

measuring a total thickness of the absorbing material layer and the light transmitting member layer; and determining the focal distance on the basis of a measured value of the total thickness.

8. The laser shock processing method according to claim 5, wherein the step of forming the light absorbing material layer includes the sub-steps of:

forming the absorbing material layer while simultaneously measuring a thickness thereof; and controlling the thickness of the absorbing material layer.

9. A laser shock processing method for evaporating a light absorbing material by irradiation of laser light and for applying a shock to a metallic workpiece by utilizing an increase in pressure due to evaporation of the light absorbing material, comprising the steps of:

forming a light absorbing material layer for absorbing laser light, on a surface of a metallic workpiece, while simultaneously measuring a thickness of the light absorbing material layer and performing a control operation that controls the thickness of the light absorbing material layer;

covering the formed light absorbing material layer with a light transmitting member layer; and irradiating the light absorbing material layer through the light transmitting member layer with a laser light pulse while the light absorbing material layer to be irradiated with the laser light pulse is moved successively at such a pitch that no unirradiated portion occurs.

10. The laser shock processing method according to claim 9, wherein the pitch is not more than 0.87 times a laser spot diameter of the laser light pulse.

11. The laser shock processing method according to claim 9, wherein the step of forming the light absorbing material layer includes the sub-steps of:

forming the absorbing material layer while simultaneously measuring a thickness thereof; and controlling the thickness of the absorbing material layer.

12. The laser shock processing method according to claim 9, wherein the step of irradiating the light absorbing material layer with the laser light pulse includes the sub-step of irradiating with said laser light pulse while simultaneously regulating a focal distance corresponding to the laser light to be irradiated.

13. A laser shock processing method for evaporating a light absorbing material by irradiation of laser light and for applying a shock to a metallic workpiece by utilizing an increase in pressure due to evaporation of the light absorbing material, comprising the steps of:

performing chemical polishing on a surface of a metallic workpiece;

forming a light absorbing material layer on the polished surface of the metallic workpiece;

mounting a light transmitting member on the light absorbing material layer; and irradiating the light absorbing material layer with a laser light pulse through the light transmitting member.

14. The laser shock processing method according to claim 13, wherein the step of mounting the light transmitting member includes the sub-step of placing the metallic workpiece, on the surface of which the light absorbing material layer is formed, in light transmitting liquid.

15. The laser shock processing method according to claim 14, wherein the light transmitting liquid is distilled water.

16. The laser shock processing method according to claim 14, wherein the step of performing the chemical polishing includes the sub-step of treating the surface of the metallic workpiece with hydrogen fluoride and hydrogen peroxide.

17. A laser shock processing method for evaporating a light absorbing material by irradiation of laser light and for applying a shock to a metallic workpiece by utilizing an increase in pressure due to evaporation of the light absorbing material, comprising the steps of:

forming a wear resistant layer on a surface of a metallic workpiece by means of spray coating;

forming a light absorbing material layer on the formed sprayed coating; forming a light transmitting member layer on the formed light absorbing material layer; and irradiating the light absorbing material layer with a laser light pulse through the light transmitting member layer.

18. The laser shock processing method according to claim 17, wherein the step of forming a light absorbing material layer is performed by simultaneously measuring a thickness of the light absorbing material layer and by performing a control operation that controls the thickness of the light absorbing material layer.

19. The laser shock processing method according to claim 17, wherein the step of forming a sprayed coating comprises the sub-step of performing plasma flame spraying by using powder having a particle diameter which is not more than 10 μm.

20. The laser shock processing method according to claim 17, wherein the step of forming a sprayed coating is performed at a temperature which is not higher than 150 degrees centigrade.

* * * * *